(12) United States Patent
Abotabl et al.

(10) Patent No.: US 12,739,649 B2
(45) Date of Patent: Sep. 15, 2026

(54) TECHNIQUES FOR FULL-DUPLEX LISTEN-BEFORE-TALK OPERATIONS IN AN UNLICENSED RADIO FREQUENCY SPECTRUM

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Krishna Kiran Mukkavilli, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 142 days.

(21) Appl. No.: 17/184,960

(22) Filed: Feb. 25, 2021

(65) Prior Publication Data

US 2022/0272543 A1 Aug. 25, 2022

(51) Int. Cl.
*H04W 16/14* (2009.01)
*H04L 5/14* (2006.01)
(Continued)

(52) U.S. Cl.
CPC ............... *H04W 16/14* (2013.01); *H04L 5/14* (2013.01); *H04W 28/26* (2013.01);
(Continued)

(58) Field of Classification Search
CPC ......... H04W 74/0816; H04W 72/0446; H04W 16/14; H04W 28/26; H04W 72/0453; H04W 72/042; H04W 74/006; H04L 5/14
See application file for complete search history.

(56) References Cited

U.S. PATENT DOCUMENTS

2014/0241285 A1* 8/2014 Pang ................. H04W 74/0833 370/329
2016/0028520 A1* 1/2016 Nogami ................ H04W 24/08 370/329

(Continued)

FOREIGN PATENT DOCUMENTS

WO WO-2019213414 A1 11/2019
WO WO-2020068251 A1 * 4/2020 ............ H04W 72/23
WO WO-2020249229 A1 12/2020

OTHER PUBLICATIONS

International Search Report and Written Opinion—PCT/US2022/070344—ISA/EPO—May 13, 2022.

*Primary Examiner* — Huy D Vu
*Assistant Examiner* — Bao G Nguyen
(74) *Attorney, Agent, or Firm* — Holland & Hart LLP

(57) ABSTRACT

Methods, systems, and devices for wireless communication are described. A communication device, which may be known as user equipment (UE), may determine a set of resources for a channel access procedure (e.g. a listen-before-talk (LBT) operation) in a shared radio frequency spectrum band. The set of resources may include one or more zero-power reference signal (ZP-RS) resources, one or more reserved channel access resources, or both. The UE may perform, while operating in a full duplex mode and during a duration in which the UE has not been scheduled to receive any downlink transmission, the channel access procedure on the set of resources for a channel in the shared radio frequency spectrum band. Based on the result of the channel access procedure, the UE may transmit an uplink transmission over the channel.

26 Claims, 25 Drawing Sheets

(51) Int. Cl.
*H04W 28/26* (2009.01)
*H04W 72/0446* (2023.01)
*H04W 72/0453* (2023.01)
*H04W 72/23* (2023.01)
*H04W 74/0816* (2024.01)

(52) U.S. Cl.
CPC ... *H04W 72/0446* (2013.01); *H04W 72/0453* (2013.01); *H04W 72/23* (2023.01); *H04W 74/0816* (2013.01)

(56) References Cited

U.S. PATENT DOCUMENTS

2016/0065350 A1* 3/2016 Suzuki .................. H04L 5/0051 370/329
2016/0183299 A1* 6/2016 Fang .................. H04W 72/042 370/329
2016/0227425 A1* 8/2016 Kim ...................... H04L 5/0007
2017/0079060 A1 3/2017 Keating et al.
2017/0223677 A1* 8/2017 Dinan ............... H04W 74/0808
2018/0152927 A1* 5/2018 Kim ...................... H04W 72/52
2020/0022174 A1* 1/2020 Karaki .............. H04W 72/0453
2020/0267730 A1 8/2020 Kim et al.
2020/0280971 A1* 9/2020 Moon ................... H04L 5/0094
2020/0304192 A1* 9/2020 Yum ..................... H04L 1/0069
2020/0374933 A1 11/2020 Lou et al.
2021/0160867 A1 5/2021 Tang
2021/0204326 A1* 7/2021 Zhang ................. H04W 72/042
2022/0061094 A1* 2/2022 Jung ................... H04W 74/006
2022/0132420 A1* 4/2022 Narasimha ............ H04W 76/28
2022/0159580 A1* 5/2022 Su ..................... H04W 72/0446
2022/0225407 A1* 7/2022 Wang ................ H04W 74/0833
2023/0156681 A1* 5/2023 Tooher ................ H04W 72/542 370/329

* cited by examiner

300

600

700

9 microseconds 9 microseconds 4 microseconds 4 microseconds 25 microseconds Cat 2 LBT

Figure 8:
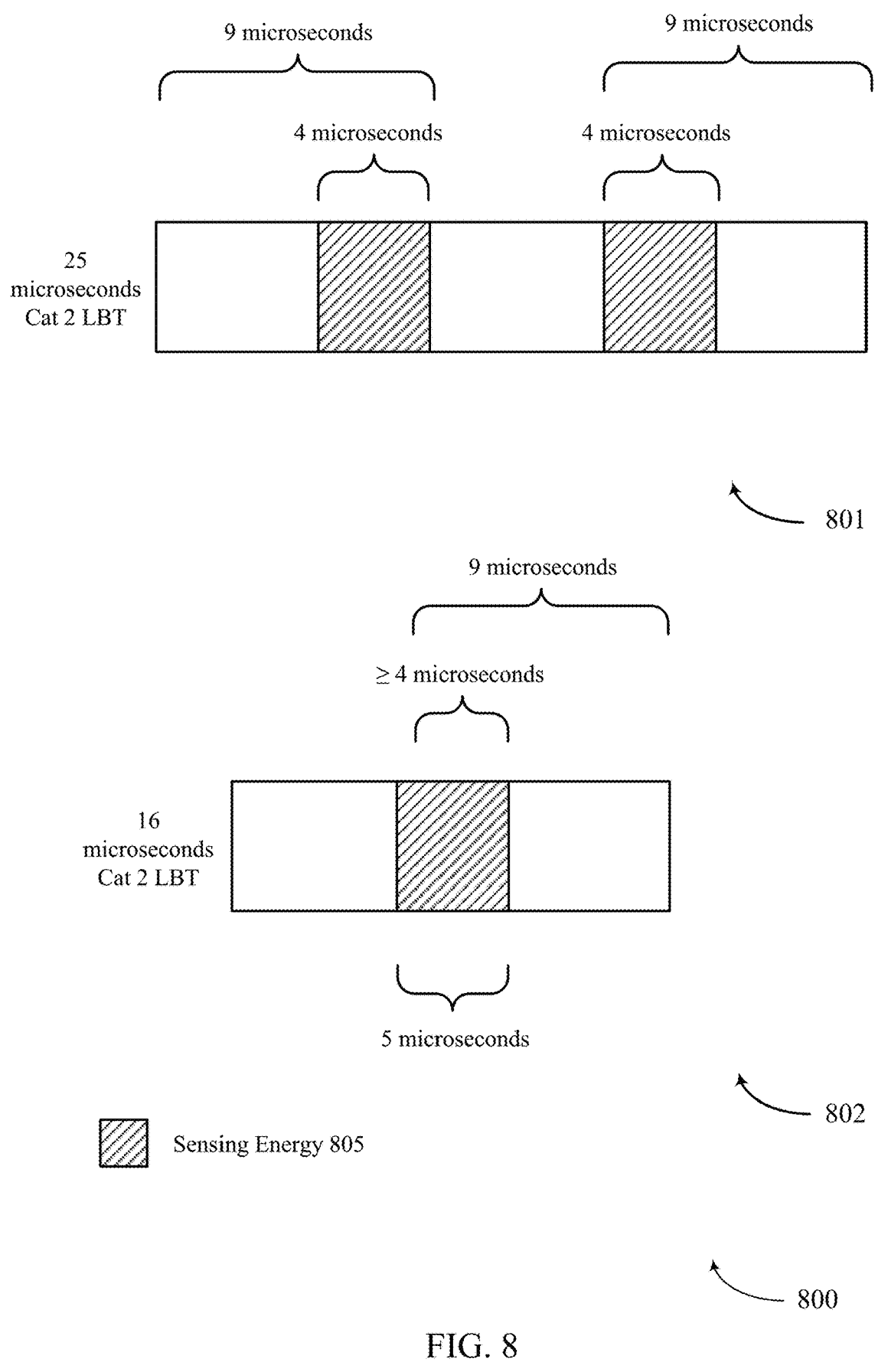

801

9 microseconds

≥ 4 microseconds 16 microseconds Cat 2 LBT 5 microseconds

802

Sensing Energy 805

Figure 25:
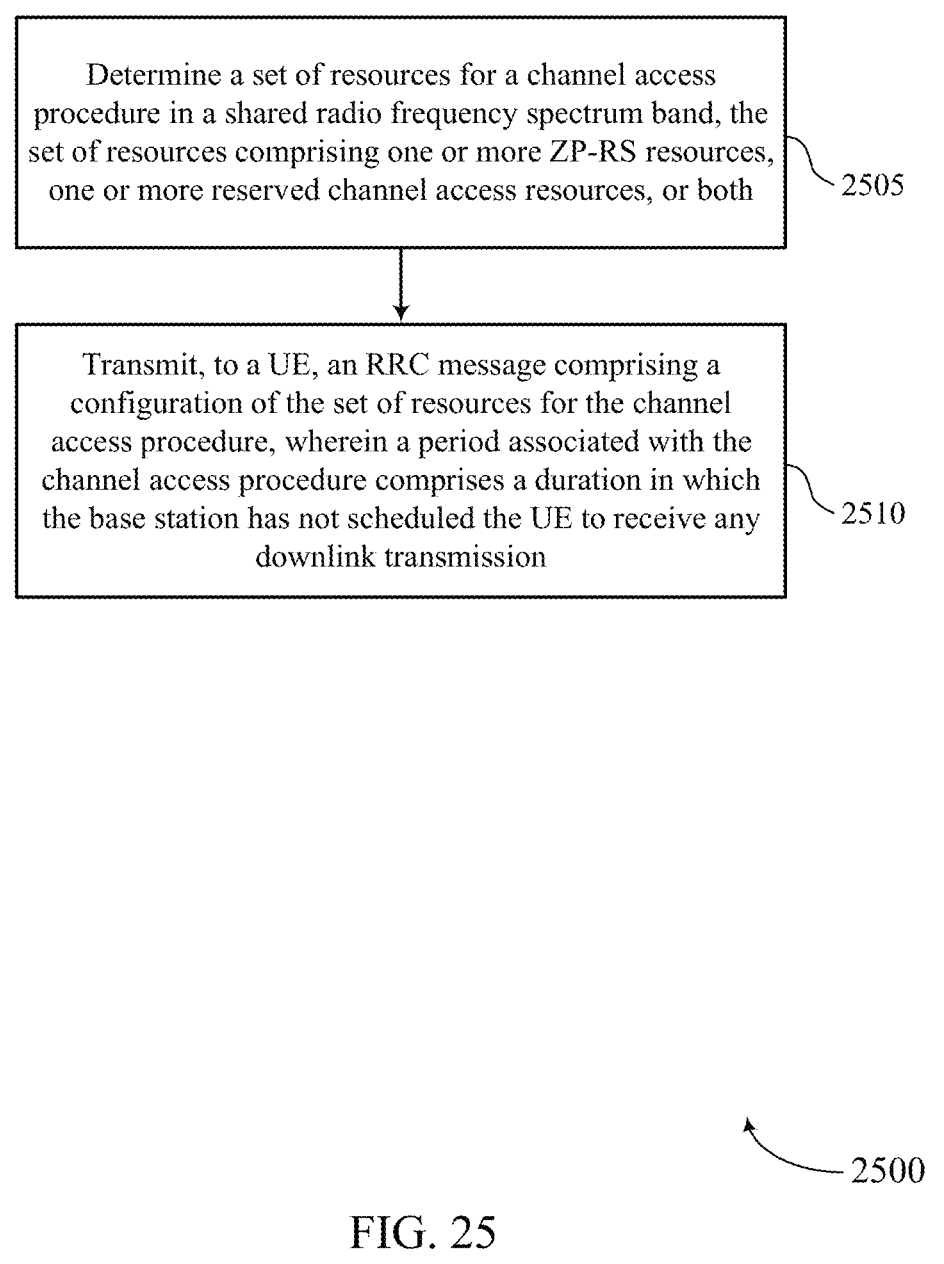

Determine a set of resources for a channel access procedure in a shared radio frequency spectrum band, the set of resources comprising one or more ZP-RS resources, one or more reserved channel access resources, or both

2505

Transmit, to a UE, an RRC message comprising a configuration of the set of resources for the channel access procedure, wherein a period associated with the channel access procedure comprises a duration in which the base station has not scheduled the UE to receive any downlink transmission

TECHNIQUES FOR FULL-DUPLEX LISTEN-BEFORE-TALK OPERATIONS IN AN UNLICENSED RADIO FREQUENCY SPECTRUM

FIELD OF TECHNOLOGY

The following relates to wireless communication, including techniques for full-duplex listen-before-talk (LBT) operations in an unlicensed radio frequency spectrum.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for full-duplex listen-before-talk (LBT) operations in an unlicensed radio frequency spectrum. Generally, the described techniques provide for a user equipment (UE) to perform a channel access procedure while operating in a full duplex mode. The UE may be configured with a set of resources, which may include zero-power reference signal (ZP-RS) resources or reserved resources, for the channel access procedure. These configured resources may indicate that the UE does not expect any downlink transmissions in these resources during the channel access procedure. The network (e.g., a base station) may signal the configured resources to the UE using various signaling.

For example, the set of resources may be semi-static configured (e.g., via a radio resource control (RRC) message) or dynamically configured (e.g., indicated) via a medium access control-control element (MAC-CE) or a downlink control information (DCI). The semi-static configuration may indicate time and frequency resources (e.g., symbols, slots, subcarriers, carriers) of the set of resources, which the UE may use to perform the channel access procedure while operating in the full duplex mode. Alternatively, the dynamic indication may indicate which resources of the set of resources are activated or deactivated for the channel access procedure while operating in the full duplex mode. The described techniques may thereby promote higher reliability and lower latency wireless communications, among other benefits, by providing an efficient channel access procedures.

A method for wireless communication at a UE is described. The method may include determining a set of resources for a channel access procedure in a shared radio frequency spectrum band, the set of resources including one or more ZP-RS resources, one or more reserved channel access resources, or both, performing, while operating in a full duplex mode and during a duration in which the UE has not been scheduled to receive any downlink transmission, the channel access procedure on the set of resources for a channel in the shared radio frequency spectrum band, and transmitting an uplink transmission over the channel based on the channel access procedure.

An apparatus for wireless communication at a UE is described. The apparatus may include a processor, memory coupled with the processor, and instructions stored in the memory. The instructions may be executable by the processor to cause the apparatus to determine a set of resources for a channel access procedure in a shared radio frequency spectrum band, the set of resources including one or more ZP-RS resources, one or more reserved channel access resources, or both, perform, while operating in a full duplex mode and during a duration in which the UE has not been scheduled to receive any downlink transmission, the channel access procedure on the set of resources for a channel in the shared radio frequency spectrum band, and transmit an uplink transmission over the channel based on the channel access procedure.

Another apparatus for wireless communication at a UE is described. The apparatus may include means for determining a set of resources for a channel access procedure in a shared radio frequency spectrum band, the set of resources including one or more ZP-RS resources, one or more reserved channel access resources, or both, means for performing, while operating in a full duplex mode and during a duration in which the UE has not been scheduled to receive any downlink transmission, the channel access procedure on the set of resources for a channel in the shared radio frequency spectrum band, and means for transmitting an uplink transmission over the channel based on the channel access procedure.

A non-transitory computer-readable medium storing code for wireless communication at a UE is described. The code may include instructions executable by a processor to determine a set of resources for a channel access procedure in a shared radio frequency spectrum band, the set of resources including one or more ZP-RS resources, one or more reserved channel access resources, or both, perform, while operating in a full duplex mode and during a duration in which the UE has not been scheduled to receive any downlink transmission, the channel access procedure on the set of resources for a channel in the shared radio frequency spectrum band, and transmit an uplink transmission over the channel based on the channel access procedure.

Some examples of the method, apparatuses, and non-transitory computer-readable medium described herein may further include operations, features, means, or instructions for receiving, from a base station, an RRC message including a configuration of the set of resources for the channel access procedure, where determining the set of resources for the channel access procedure may be based on the RRC message.

Some examples of the method, apparatuses, and non-transitory computer-readable medium described herein may further include operations, features, means, or instructions for determining the set of resources for the channel access procedure in at least a time domain based on the configuration, where performing the channel access procedure may be based on the set of resources in at least the time domain.

Some examples of the method, apparatuses, and non-transitory computer-readable medium described herein may further include operations, features, means, or instructions for identifying a bitmap indicating the set of resources in at least the time domain based on the configuration, the set of resources including one or more orthogonal frequency division multiplexing symbols in the time domain, where performing the channel access procedure may be based on the bitmap indicating the set of resources in at least the time domain.

Some examples of the method, apparatuses, and non-transitory computer-readable medium described herein may further include operations, features, means, or instructions for identifying, based on the configuration, a beginning symbol of the set of resources in at least the time domain, an ending symbol of the set of resources in at least the time domain, or a length of the set of resources in at least the time domain, or any combination thereof, where performing the channel access procedure may be based on the beginning symbol of the set of resources in at least the time domain, the ending symbol of the set of resources in at least the time domain, or the length of the set of resources in at least the time domain, or the combination thereof.

Some examples of the method, apparatuses, and non-transitory computer-readable medium described herein may further include operations, features, means, or instructions for determining a periodicity of the set of resources based on the configuration, where performing the channel access procedure may be based on the periodicity of the set of resources.

Some examples of the method, apparatuses, and non-transitory computer-readable medium described herein may further include operations, features, means, or instructions for determining a symbol boundary or a slot boundary, or both, associated with the set of resources in at least a time domain based on the configuration, where performing the channel access procedure may be based on the symbol boundary, or the slot boundary, or both, associated with the set of resources in at least the time domain.

Some examples of the method, apparatuses, and non-transitory computer-readable medium described herein may further include operations, features, means, or instructions for determining, based on the configuration, a resource pattern of the set of resources in at least a time domain, or at least a frequency domain, or both, where the set of resources may be aperiodic based on the resource pattern, where performing the channel access procedure may be based on the resource pattern of the set of resources in at least the time domain, or in at least the frequency domain, or both.

In some examples of the method, apparatuses, and non-transitory computer-readable medium described herein, the RRC message includes an RRC information element (IE) indicating the set of resources for the channel access procedure in the shared radio frequency spectrum band.

Some examples of the method, apparatuses, and non-transitory computer-readable medium described herein may further include operations, features, means, or instructions for receiving, from a base station, a DCI message, or a MAC-CE message, or both, including an indication of the set of resources for the channel access procedure in the shared radio frequency spectrum band, where determining the set of resources for the channel access procedure may be based on the DCI message, or the MAC-CE message, or both.

Some examples of the method, apparatuses, and non-transitory computer-readable medium described herein may further include operations, features, means, or instructions for determining timing information, or frequency information, both, associated with the set of resources based on the indication, where determining the set of resources for the channel access procedure may be based on the timing information or frequency information, both, associated with the set of resources.

Some examples of the method, apparatuses, and non-transitory computer-readable medium described herein may further include operations, features, means, or instructions for activating one or more resources of the set of resources based on the indication, where performing the channel access procedure may be based on the activating of the one or more resources of the set of resources.

Some examples of the method, apparatuses, and non-transitory computer-readable medium described herein may further include operations, features, means, or instructions for deactivating one or more resources of the set of resources based on the indication, where performing the channel access procedure may be based on the deactivating of the one or more resources of the set of resources.

Some examples of the method, apparatuses, and non-transitory computer-readable medium described herein may further include operations, features, means, or instructions for selecting one or more resources of the set of resources based on the indication, where performing the channel access procedure may be based on the selecting of the one or more resources of the set of resources.

Some examples of the method, apparatuses, and non-transitory computer-readable medium described herein may further include operations, features, means, or instructions for determining an overlap between the set of resources and a channel access occasion associated with the channel access procedure in a time domain, or a frequency domain, or both and terminating the channel access procedure based on the overlap between the set of resources and the channel access occasion associated with the channel access procedure.

Some examples of the method, apparatuses, and non-transitory computer-readable medium described herein may further include operations, features, means, or instructions for determining an overlap between the set of resources and a channel access occasion associated with the channel access procedure in a time domain, or a frequency domain, or both, adjusting a channel access parameter based on the overlap between the set of resources and the channel access occasion associated with the channel access procedure, where performing the channel access procedure may be based on the adjusting of the channel access parameter.

Some examples of the method, apparatuses, and non-transitory computer-readable medium described herein may further include operations, features, means, or instructions for receiving, from a base station, a downlink transmission on a second set of resources, rate matching the second set of resources around the set of resources, and decoding the downlink transmission based on the rate matching of the second set of resources.

Some examples of the method, apparatuses, and non-transitory computer-readable medium described herein may further include operations, features, means, or instructions for receiving, from a base station, a downlink transmission on a second set of resources, puncturing the second set of resources based on the set of resources, and decoding the downlink transmission based on the puncturing of the second set of resources.

Some examples of the method, apparatuses, and non-transitory computer-readable medium described herein may further include operations, features, means, or instructions for receiving, from a base station, a downlink transmission on a second set of resources, determining that an overlap between the set of resources and the second set of resources satisfies a threshold, where the second set of resources include downlink resources, and refraining from decoding the downlink transmission based on the determining of the overlap between the set of resources and the second set of resources satisfying the threshold.

In some examples of the method, apparatuses, and non-transitory computer-readable medium described herein, the channel access procedure includes an LBT procedure.

A method for wireless communication at a base station is described. The method may include determining a set of resources for a channel access procedure in a shared radio frequency spectrum band, the set of resources including one or more ZP-RS resources, one or more reserved channel access resources, or both and transmitting, to a UE, an RRC message including a configuration of the set of resources for the channel access procedure, where a period associated with the channel access procedure includes a duration in which the base station has not scheduled the UE to receive any downlink transmission.

An apparatus for wireless communication at a base station is described. The apparatus may include a processor, memory coupled with the processor, and instructions stored in the memory. The instructions may be executable by the processor to cause the apparatus to determine a set of resources for a channel access procedure in a shared radio frequency spectrum band, the set of resources including one or more ZP-RS resources, one or more reserved channel access resources, or both and transmit, to a UE, an RRC message including a configuration of the set of resources for the channel access procedure, where a period associated with the channel access procedure includes a duration in which the base station has not scheduled the UE to receive any downlink transmission.

Another apparatus for wireless communication at a base station is described. The apparatus may include means for determining a set of resources for a channel access procedure in a shared radio frequency spectrum band, the set of resources including one or more ZP-RS resources, one or more reserved channel access resources, or both and means for transmitting, to a UE, an RRC message including a configuration of the set of resources for the channel access procedure, where a period associated with the channel access procedure includes a duration in which the base station has not scheduled the UE to receive any downlink transmission.

A non-transitory computer-readable medium storing code for wireless communication at a base station is described. The code may include instructions executable by a processor to determine a set of resources for a channel access procedure in a shared radio frequency spectrum band, the set of resources including one or more ZP-RS resources, one or more reserved channel access resources, or both and transmit, to a UE, an RRC message including a configuration of the set of resources for the channel access procedure, where a period associated with the channel access procedure includes a duration in which the base station has not scheduled the UE to receive any downlink transmission.

Some examples of the method, apparatuses, and non-transitory computer-readable medium described herein may further include operations, features, means, or instructions for transmitting, to the UE, a DCI message, or a MAC-CE message, or both, including an indication of the set of resources for the channel access procedure in the shared radio frequency spectrum band.

In some examples of the method, apparatuses, and non-transitory computer-readable medium described herein, the configuration includes a bitmap indicating the set of resources in at least a time domain based on the configuration, the set of resources including one or more orthogonal frequency division multiplexing symbols in the time domain.

In some examples of the method, apparatuses, and non-transitory computer-readable medium described herein, the configuration includes a beginning symbol of the set of resources in at least a time domain, an ending symbol of the set of resources in at least the time domain, or a length of the set of resources in at least the time domain, or any combination thereof.

In some examples of the method, apparatuses, and non-transitory computer-readable medium described herein, the configuration includes a periodicity of the set of resources.

In some examples of the method, apparatuses, and non-transitory computer-readable medium described herein, the configuration includes a symbol boundary or a slot boundary associated with the set of resources in at least a time domain.

Some examples of the method, apparatuses, and non-transitory computer-readable medium described herein may further include operations, features, means, or instructions for transmitting, to the UE, an indication to activate or deactivate one or more resources of the set of resources for the channel access procedure.

Some examples of the method, apparatuses, and non-transitory computer-readable medium described herein may further include operations, features, means, or instructions for transmitting, to the UE, an indication to select one or more resources of the set of resources for the channel access procedure.

BRIEF DESCRIPTION OF THE DRAWINGS

FIG. 8 illustrates examples of transmission timelines that support techniques for full-duplex LBT operations in an unlicensed radio frequency spectrum in accordance with aspects of the present disclosure.

FIGS. 19 through 25 show flowcharts illustrating methods that support techniques for full-duplex LBT operations in an unlicensed radio frequency spectrum in accordance with aspects of the present disclosure.

DETAILED DESCRIPTION

Figure 1:
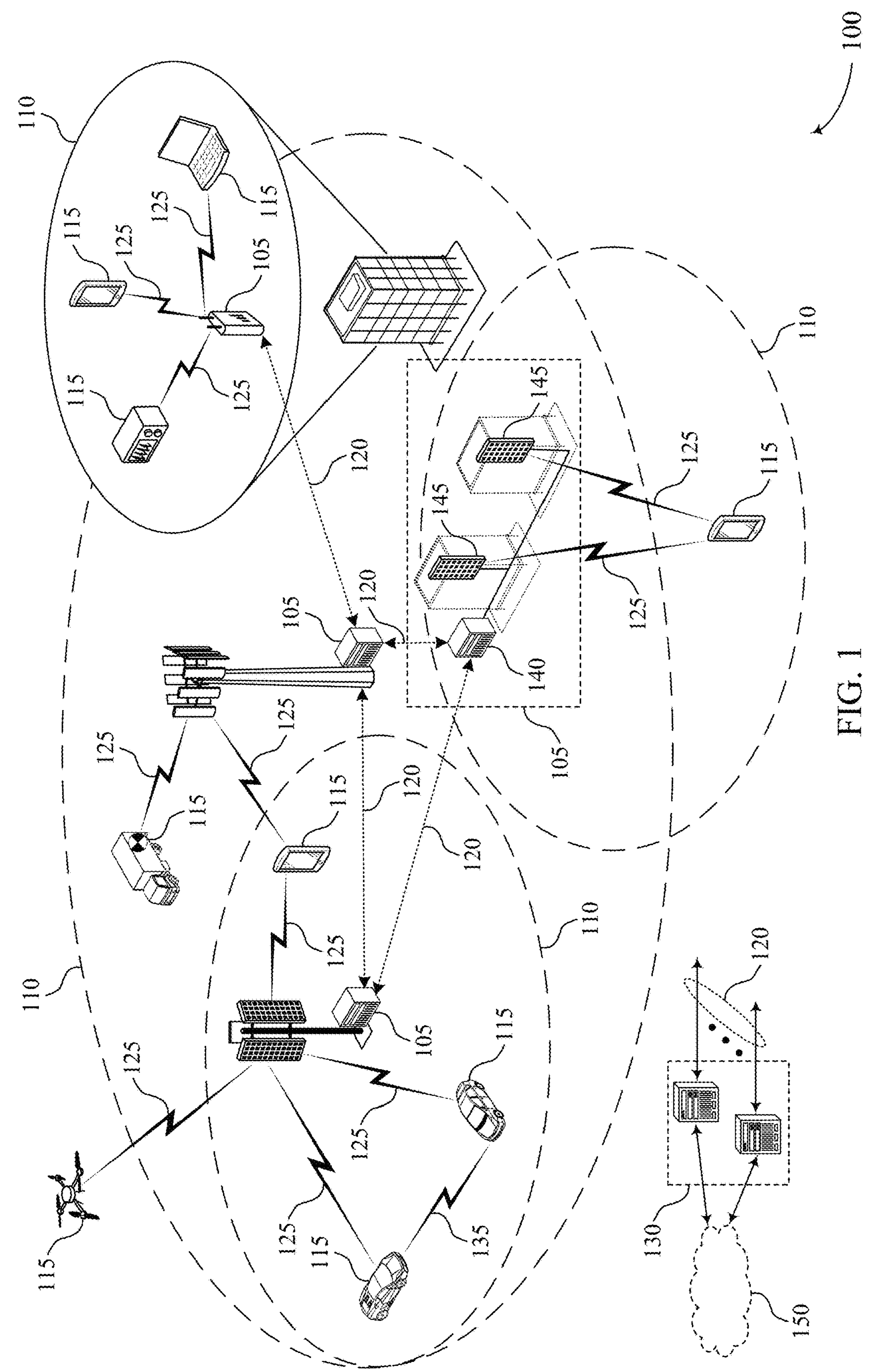
FIGS. 1 and 2 illustrate examples of wireless communications systems that support techniques for full-duplex listen-before-talk (LBT) operations in an unlicensed radio frequency spectrum in accordance with aspects of the present disclosure.

A wireless communications system may include various communication devices, such as a UE and a base station, which may provide wireless communication services to the UE. For example, such a base station may be a next-generation NodeB (which may be referred to as a gNB) that may support multiple radio access technologies including 4G systems, such as 4G LTE, as well as 5G systems (which may be referred to as 5G NR). In the wireless communications system, a UE may operate in a full duplex mode, in which the UE may concurrently transmit uplink transmissions and receive downlink transmissions over a channel. In some cases, the channel may be part of an unlicensed radio frequency spectrum band, and may be shared with other communication devices (e.g., other UEs) in the wireless communications system.

In some cases, because the channel is shared, the UE may perform a channel access procedure (e.g., a listen-before-talk (LBT) procedure) to determine the availability of the channel. For example, the UE may determine whether the channel is available (e.g., not used by other communication devices) or unavailable (e.g., used by other communication devices). In some cases, when the UE is receiving downlink transmissions, the UE may be unable to perform the channel access procedure because the downlink transmission may interfere with channel measurements for determining the availability of the channel for uplink transmissions. The result of the channel access procedure may lead to a busy channel even though the channel might actually be available for uplink transmissions. As a result, the UE may experience unused resources.

Various aspects of the present disclosure relate to configuring a UE to support performing a channel access procedure while operating in a full duplex mode. The UE may be configured with a set of resources, which may include zero-power reference signal (ZP-RS) resources or reserved resources for the channel access procedure. These configured resources may imply that the UE does not expect any downlink transmissions in these resources during the channel access procedure. The network (e.g., a base station) may signal the configured resources to the UE using various signaling. For example, the set of resources may be semi-static configured (e.g., radio resource control (RRC) configured) or dynamically indicated via a medium access control-control element (MAC-CE) or a downlink control information (DCI). The semi-static configuration may indicate time and frequency resources (e.g., symbols, slots, subcarriers, carriers) of the set of resources, which the UE may use to perform the channel access procedure while operating in the full duplex mode. Alternatively, the dynamic indication may indicate which resources of the set of resources are activated or deactivated for the channel access procedure while operating in the full duplex mode.

Operations performed by the UE may provide improvements to wireless communications by increasing the reliability and reducing the latency of wireless communications over an unlicensed radio frequency spectrum band. Additionally, the UE may experience power saving, for example, by providing efficient channel access procedures in the wireless communications system.

Aspects of the disclosure are initially described in the context of wireless communications systems. Aspects of the disclosure are further illustrated by and described with reference to apparatus diagrams, system diagrams, and flowcharts that relate to techniques for full-duplex LBT operations in an unlicensed radio frequency spectrum.

FIG. 1 illustrates an example of a wireless communications system 100 that supports techniques for full-duplex LBT operations in an unlicensed radio frequency spectrum in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). The more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may include one or more UE 115 configured with a full-duplex mode. The UE 115 configured to operate in the full-duplex mode may be able to transmit and receive signals within a same frame or subframe. A UE 115 that operates in the full-duplex mode may use in-band full-duplex (IBFD), sub-band full-duplex (SBFD), or a combination thereof. A UE 115 that supports IBFD may transmit and receive on a same time and frequency resource. Alternatively, a UE 115 that supports SBFD may transmit and receive on the same time resource but on different frequency resources.

The wireless communications system 100 may support resource configurations that enable a UE 115 to be configured with a set of resources, which may include ZP-RS resources or reserved resources for a channel access procedure. The configured set of resources may imply that the resources may not include any downlink transmissions during the channel access procedure. A network may signal the configured resources to the UE 115 using various signaling. For example, the set of resources may be semi-static configured (e.g., RRC configured) or dynamically indicated via a MAC-CE or a DCI. In some other examples, the UE may be self-configured for the configured set of resources.

The semi-static configuration may indicate time and frequency resources (e.g., symbols, slots, subcarriers, carriers) of the set of resources, which the UE 115 may use to perform the channel access procedure while operating in a full duplex mode. Alternatively, the dynamic indication may indicate which resources of the set of resources are activated, deactivated, or both, for the channel access procedure while operating in the full duplex mode. Upon determining that the set of resources is available for transmission based on the channel access procedure, the UE 115 may transmit an uplink transmission.

The wireless communications system 100 may enhance wireless communications. By configuring a UE 115 to support efficient channel access procedures for a channel in a shared radio frequency spectrum band, the UE 115 may promote higher reliability and lower latency wireless communications, among other benefits.

Figure 2:
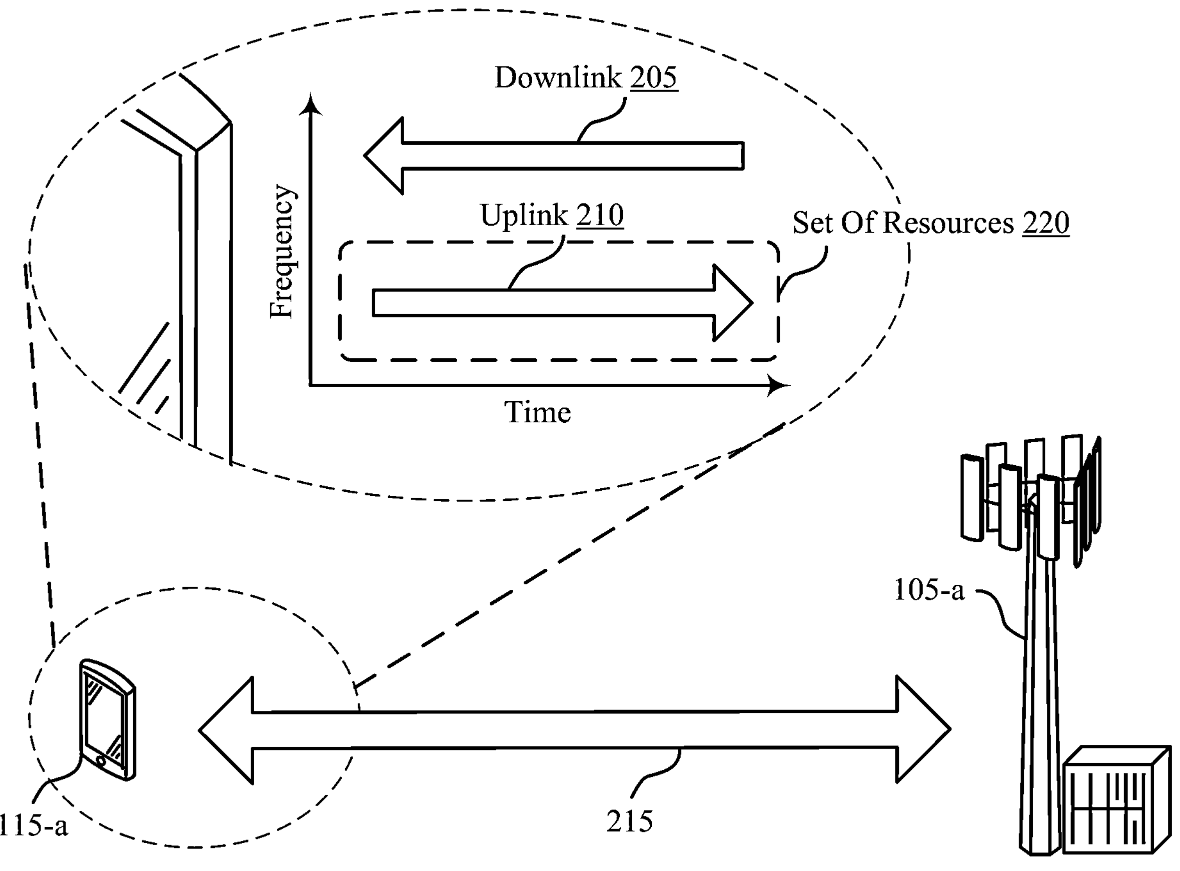

FIG. 2 illustrates an example of a wireless communications system 200 that supports techniques for full-duplex LBT operations in an unlicensed radio frequency spectrum in accordance with aspects of the present disclosure. The wireless communications system 200 may implement aspects of the wireless communications system 100 or may be implemented by aspects of the wireless communications system 100. The wireless communications system 200 may include a base station 105-*a* and a UE 115-*a*, which may be examples of the corresponding devices described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may support improvements to power consumption, spectral efficiency, higher data rates and, in some examples, may promote enhanced efficiency for higher reliability and lower latency wireless communications, among other benefits.

The UE 115-*a* may be capable of full duplex communication, and may be able to receive a downlink 205 transmission and transmit an uplink 210 transmission over a communication link 215 within a same time duration (e.g., slot, subframe, frame). In some examples, the UE 115-*a* may be capable of in-band full duplex communication (IBFD), in which the UE 115-*a* may transmit and receive on the same time and frequency resources. In some other examples, the UE 115-*a* may be capable of sub-band full duplex (SBFD), in which the UE 115-*a* may transmit and receive on the same time resource, but different frequency resources. In some examples, the UE 115-*a* may operate in a shared radio frequency spectrum band (e.g., an unlicensed frequency spectrum band) that shares a spectrum with other radio access technologies (e.g., an NR-U system, a Wi-Fi system) or between wireless communication systems, or both.

In some cases, the UE 115-*a* may receive a downlink 205 transmission, and may receive an uplink grant (e.g., while receiving the downlink 205 transmission, or during other times) for an uplink 210 transmission. The UE 115-*a* may perform a channel access procedure (e.g., an LBT procedure) by sensing energy in a channel, and may determine whether to transmit the uplink 210 transmission based on the result of the channel access procedure. The UE 115-*a* may sense a high amount of energy in the channel due to the UE 115-*a* already receiving the downlink 205 transmission, and may erroneously determine that the channel is unavailable. That is, the channel may be available for an uplink 210 transmission due to the UE 115-*a* being capable of full duplex communication. The UE 115-*a* may not transmit the uplink 210 transmission upon determining that the channel is unavailable, which may be a waste of resources (e.g., time resources, frequency resources, or both) if the UE 115-*a* transmits the uplink 210 transmission at a later time or on a different frequency.

The UE 115-*a* may be pre-configured with a set of resources 220 for a channel access procedure, which may include ZP-RS resources, specific reserved resources, or both, to prevent jamming when the UE 115-*a* performs the channel access procedure. For example, the UE 115-*a* may receive a downlink 205 transmission, and may receive an uplink grant for an uplink 210 transmission. The UE 115-*a* may then perform a channel access procedure on the set of resources 220. In some examples, the UE 115-*a* may determine that the set of resources 220 are available as a result of receiving the downlink 205 transmission on other resources, and may transmit the uplink 210 transmission. The set of resources 220 may including ZP-RS resources, reserved resources, or both, may be defined in a time domain and a frequency domain. For example, time domain resources may be defined in terms of symbols or time. A bitmap or a start and length indicator value (SLIV) indication may include or indicate symbols for the set of resources 220. In some other examples, the UE 115-*a* may be configured with a set of defined timings for the set of resources 220. The defined timings may include a starting time for the set of resources 220, which may be defined by a symbol, a slot boundary, or the like.

The base station 105-*a* may configure (e.g., with RRC signaling, dynamically indicated via a MAC-CE or a DCI message, or the like) the UE 115-*a* with the set of resources 220 for a channel access procedure, which may include ZP-RS resources, reserved resources, or both. For example, the base station 105-*a* may RRC-configure the UE 115-*a* with an RRC information elements (IE), which may configure time resources, frequency resources, periodicity, and a muting pattern (e.g., to allow for aperiodic resources to reduce interference) for the set of resources 220. In some other examples, the base station 105-*a* may configure the UE 115-*a* via a DCI message or a MAC-CE. The DCI message or the MAC-CE may configure time resources, frequency resources, or both, for the set of resources 220. In some other examples, the DCI message may activate or deactivate RRC configured resources. The DCI message or MAC-CE may also indicate one or more RRC configured resources of multiple RRC configured resources.

The UE 115-*a* may perform a channel access procedure (e.g., an LBT procedure) on resources that may partially overlap ZP-RS resources or reserved resources. If the channel access resources fully overlap with the ZP-RS resources or the reserved resources, the UE 115-*a* may perform the channel access procedure without any modifications. However, if the channel access resources partially overlap with the ZP-RS resources or the reserved resources, the UE 115-*a* may perform one of multiple options, as described in FIG. 3. The UE 115-*a* may store, by default, information including that resources associated with the downlink 205 transmission are rate matched (e.g., canceled, or zero power) around ZP-RS resources or reserved resources.

In some cases, if the resource overlap between the resources associated with the downlink 205 transmission and the ZP-RS resources, or reserved resources, or both, is above a threshold, the UE 115-*a* may not decode the downlink 205 transmission. The UE 115-*a* may operate in an unlicensed spectrum and may receive downlink 205 transmissions from the base station 105-*a*, and transmit uplink 210 transmissions to the base station 105-*a* within a same time duration. The UE 115-*a* may perform a channel access procedure in reserved resources different from downlink 205 transmission resources, determine that the reserved resources are available for transmission, and transmit the uplink 210 transmissions.

The wireless communications system 200 may enhance wireless communications. By configuring the UE 115-*a* to support efficient channel access procedures for a channel in a shared radio frequency spectrum band, the UE 115-*a* may promote higher reliability and lower latency wireless communications, among other benefits.

Figure 3:
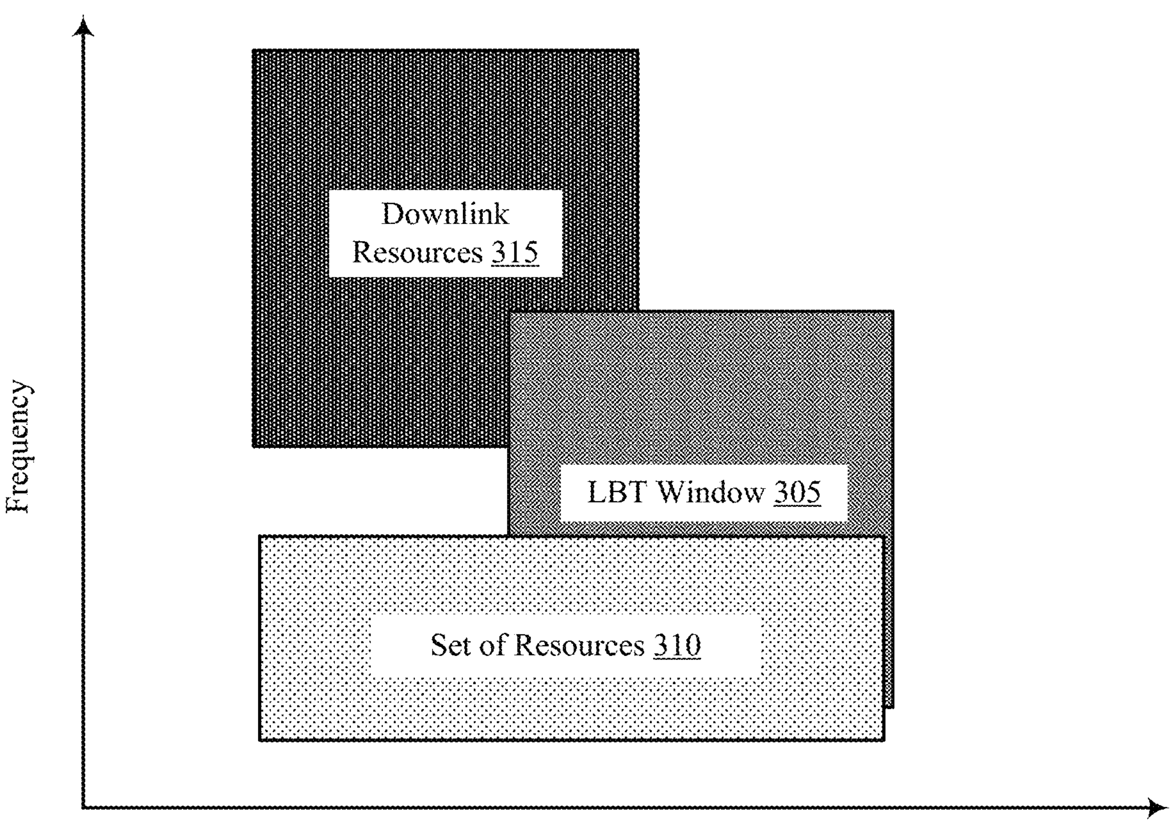
FIG. 3 illustrates an example of a resource grid that supports techniques for full-duplex LBT operations in an unlicensed radio frequency spectrum in accordance with aspects of the present disclosure.

FIG. 3 illustrates an example of a resource grid 300 that supports techniques for full-duplex LBT operations in an unlicensed radio frequency spectrum in accordance with aspects of the present disclosure. The resource grid 300 may implement aspects of the wireless communications systems 100 and 200 or may be implemented by aspects of the wireless communications systems 100 and 200 as described with reference to FIGS. 1 and 2, respectively. The resource grid 300 may include a set of resources 310 and a set of downlink resources 315. In the example of FIG. 3, an LBT window 305 may partially overlap with the set of resources 310, which may include ZP-RS resources or reserved resources. Based on the LBT window 305 partially overlapping with the set of resources 310, a UE 115 may perform one or multiple operations. A base station 105 may configure or indicate the one or multiple operations via RRC signaling, a DCI message, or a MAC-CE, or any combination thereof.

In some examples, a UE 115 may drop a channel access procedure and an uplink transmission. The UE 115 may perform the dropping operation in cases where there may be jamming from a downlink transmission on the downlink resources 315. In some other examples, a UE 115 may perform the channel access procedure with a modified configured threshold value, where the threshold value depends on the amount of resource overlap between the LBT window 305 and the set of resources 310. For example, the modified configured threshold value may be a modified a reference signal received power (RSRP) threshold value, or a modified reference signal strength indicator (RSSI) threshold value, among other examples.

The threshold value may change according to the amount of frequency resource overlap (e.g., resource blocks), time resource overlap (e.g., symbols), or both. In some examples, a higher threshold value may allow the UE 115 to determine that the amount of energy in a channel is low relative to the threshold value, even if the UE 115 may be receiving a downlink transmission. The UE 115 may transmit an uplink transmission. In yet other examples, the UE 115 may perform the channel access procedure without any modifications (e.g., in cases where the risk for interference or jamming is low).

Figures 4A, 4B, 4C:
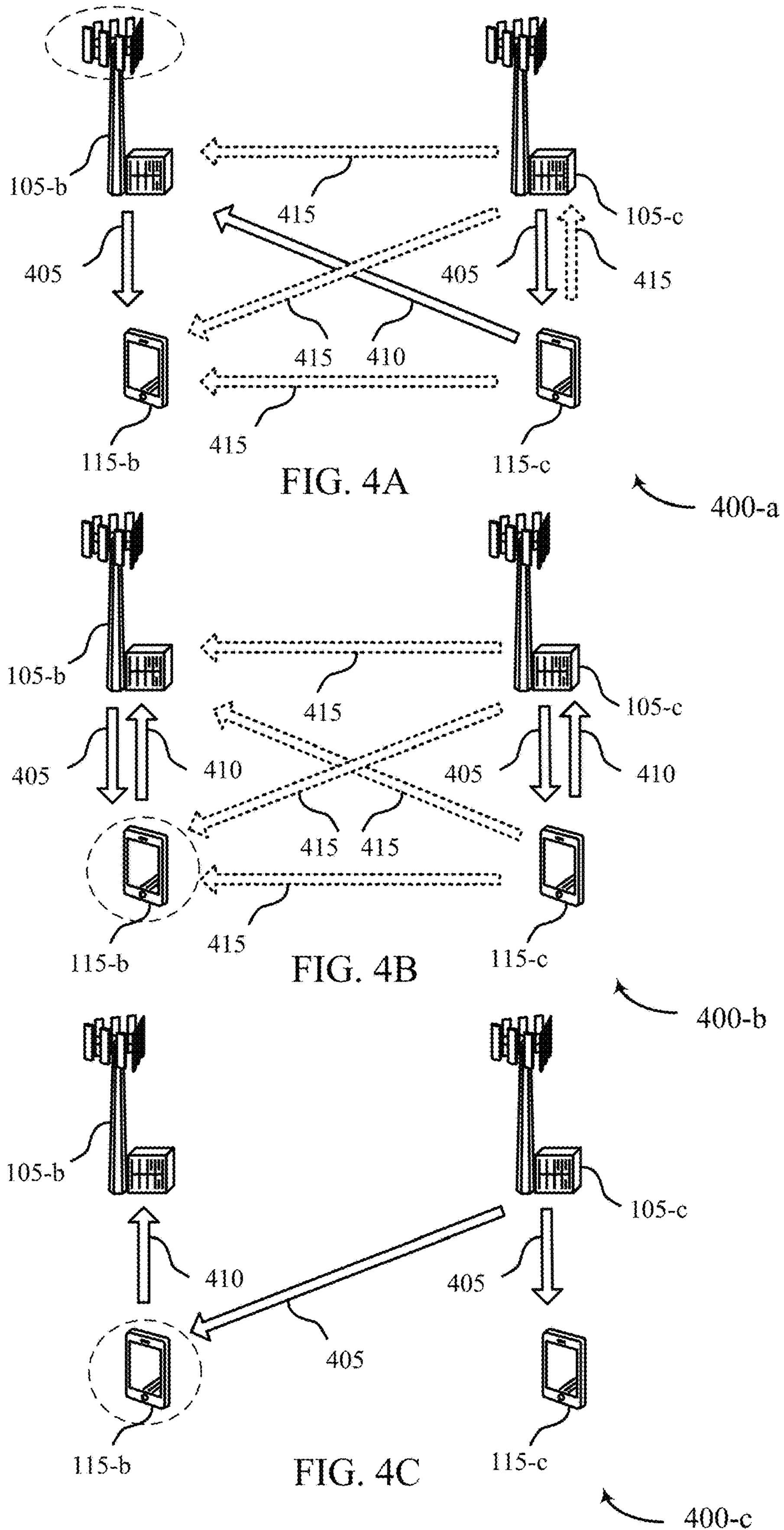
FIGS. 4A through 4C illustrate examples of wireless communications systems that support techniques for full-duplex LBT operations in an unlicensed radio frequency spectrum in accordance with aspects of the present disclosure.

FIG. 4A illustrates an example of a wireless communications system 400-*a* that supports techniques for full-duplex LBT operations in an unlicensed radio frequency spectrum in accordance with aspects of the present disclosure. The wireless communications system 400-*a* may implement aspects of the wireless communications systems 100 and 200 or may be implemented by aspects of the wireless communications systems 100 and 200 as described with reference to FIGS. 1 and 2, respectively. The wireless communications system 400-*a* may support half-duplex communications or full-duplex communications, or both. In the example of FIG. 4A, base stations 105-*b*, 105-*c* may be configured to support full-duplex communications in the wireless communications system 400-*a*. For example, the base stations 105-*b*, 105-*c* may support full-duplex communications with UEs 115-*b*, 115-*c*. The base stations 105-*b*, 105-*c* and the UEs 115-*b*, 115-*c* may be examples of base stations 105 and UEs 115 described herein.

The UEs 115-*b*, 115-*c* may be configured to operate in a half-duplex mode or a full-duplex mode. In the half-duplex mode, the UEs 115-*b*, 115-*c* may be configured to either receive downlink communications from the base stations 105-*b*, 105-*c*, or transmit uplink communications to the base stations 105-*b*, 105-*c*. In other words, in the half-duplex mode, the UEs 115-*b*, 115-*c* may be unable to jointly receive downlink communications and transmit uplink communications during a same time period. In the full-duplex mode, however, the UEs 115-*b*, 115-*c* may be configured to simultaneously receive downlink communications and transmit uplink communications from and to the base stations 105-*b*, 105-*c* during a same time period. The base station 105-*b*, 105-*c* may provide downlink communications using one or multiple directional beams. Likewise, the UEs 115-*b*, 115-*c* may provide uplink communications using one or multiple directional beams.

With reference to FIG. 4A, the base stations 105-*b*, 105-*c* may operate in a full-duplex mode, while the UEs 115-*b*, 115-*c* operate in a half-duplex mode. In some cases, one or more of the base stations 105-*b*, 105-*c* and the UEs 115-*b*, 115-*c* may experience interference in the wireless communications system 400-*a*. For example, the base station 105-*b* may experience self-interference from downlink communications to uplink communications. By way of example, the base station 105-*b* may transmit downlink communications 405 to the UE 115-*b* using at least one antenna panel of the base station 105-*b*, as well as receive uplink communications 410 from the UE 115-*c* using another antenna panel of the base station 105-*b*. This may cause self-interference at the base station 105-*b* due to, for example, simultaneous transmission of the downlink communications 405 using the at least one antenna panel of the base station 105-*b* and reception of the uplink communications 410 from the UE 115-*c* using another antenna panel of the base station 105-*b*.

The base station 105-*b* may experience some interference communications 415 from the base station 105-*c* that may relate to the downlink communications 405 from the base station 105-*c* to the UE 115-*c*. Similarly, the UE 115-*b* may experience some interference communications 415 from the base station 105-*c* that may relate to the downlink communications 405 from the base station 105-*c* to the UE 115-*c*. Additionally or alternatively, the base station 105-*c* or the UE 115-*b*, or both, may experience some interference communications 415 from the UE 115-*c* that may relate to the uplink communications 410 from the UE 115-*c* to the base station 105-*b*.

FIG. 4B illustrates an example of a wireless communications system 400-*b* that supports techniques for full-duplex LBT operations in an unlicensed radio frequency spectrum in accordance with aspects of the present disclosure. The wireless communications system 400-*b* may implement aspects of the wireless communications systems 100 and 200 or may be implemented by aspects of the wireless communications systems 100 and 200 as described with reference to FIGS. 1 and 2, respectively. The wireless communications system 400-*b* may support half-duplex communications or full-duplex communications, or both. In the example of FIG. 4B, base stations 105-*b*, 105-*c* may be configured to support full-duplex communications in the wireless communications system 400-*b*. For example, the base stations 105-*b*, 105-*c* may support full-duplex communications with UEs 115-*b*, 115-*c*. The base stations 105-*b*, 105-*c* and the UEs 115-*b*, 115-*c* may be examples of base stations 105 and UEs 115 described herein.

In the example of FIG. 4B, the UEs 115-*b*, 115-*c* may be configured to operate in a full-duplex mode. In the full-duplex mode, the UEs 115-*b*, 115-*c* may be configured to concurrently receive downlink communications and transmit uplink communications from and to the base stations 105-*b*, 105-*c*. Likewise, the base stations 105-*b*, 105-*c* may also operate in a full-duplex mode. The base station 105-*b*, 105-*c* may provide downlink communications using one or multiple directional beams. Similarly, the UEs 115-*b*, 115-*c* may provide uplink communications using one or multiple directional beams. In some cases, one or more of the base stations 105-*b*, 105-*c* and the UEs 115-*b*, 115-*c* may experience self-interference or other interference in the wireless communications system 400-*b*. For example, the UE 115-*b* may experience self-interference from downlink communications to uplink communications.

By way of example, the base station 105-*b* may transmit downlink communications 405 to the UE 115-*b*, which the UE 115-*b* may receive via at least one antenna panel of the UE 115-*b*. The UE 115-*b* may also transmit uplink communications 410 to the base station 105-*b* via another antenna panel of the UE 115-*b*. This may cause self-interference at the UE 115-*b* due to, for example, simultaneous reception of the downlink communications 405 using the at least one antenna panel of the UE 115-*b* and transmission of the uplink communications 410 using the other antenna panel of the UE 115-*b*. Likewise, the base station 105-*c* may transmit downlink communications 405 to the UE 115-*c*, and the UE 115-*c* may transmit uplink communications 410 to the base station 105-*c*. This may cause self-interference at the UE 115-*c*. The base station 105-*b* or the UE 115-*b*, or both, may also experience some interference communications 415 from the base station 105-*c* or the UE 115-*c*, or both. The interference communications 415 may be associated with the downlink communications 405 from the base station 105-*c* to the UE 115-*c*, or the uplink communications from the UE 115-*c* to the base station 105-*c*, or both.

FIG. 4C illustrates an example of a wireless communications system 400-*c* that supports techniques for full-duplex LBT operations in an unlicensed radio frequency spectrum in accordance with aspects of the present disclosure. The wireless communications system 400-*c* may implement aspects of the wireless communications systems 100 and 200 or may be implemented by aspects of the wireless communications systems 100 and 200 as described with reference to FIGS. 1 and 2, respectively. The wireless communications system 400-*c* may support half-duplex communications or full-duplex communications, or both. In the example of FIG. 4C, base stations 105-*b*, 105-*c* may be configured to support full-duplex communications in the wireless communications system 400-*a*. For example, the base stations 105-*b*, 105-*c* may support full-duplex communications with UEs 115-*b*, 115-*c*. The base stations 105-*b*, 105-*c* and the UEs 115-*b*, 115-*c* may be examples of base stations 105 and UEs 115 described herein.

For example, the UEs 115-*b*, 115-*c* may be configured to operate in a full-duplex mode. In the full-duplex mode, the UEs 115-*b*, 115-*c* may be configured to simultaneously receive downlink communications and transmit uplink communications from and to the base stations 105-*b*, 105-*c*, which may be examples of transmit receive points (TRPs), during a same time period. The base station 105-*c* may provide downlink communications using one or multiple directional beams. Likewise, the UEs 115-*b* may provide uplink communications using one or multiple directional beams.

The UEs 115-*b*, 115-*c* operate in a full-duplex mode. In some cases, one or more of the base stations 105-*b*, 105-*c* and the UEs 115-*b*, 115-*c* may experience interference in the wireless communications system 400-*a*. For example, the UE 115-*b* may experience self-interference from downlink communications to uplink communications. By way of example, the UE 115-*b* may transmit uplink communications 410 to the base station 105-*b*, as well as receive downlink communications 405 from the base station 105-*c*. This may cause self-interference at the UE 115-*b* due to, for example, simultaneous transmission of the uplink communications 410 and reception of the downlink communications 405 from the base station 105-*c*.

Figure 5:
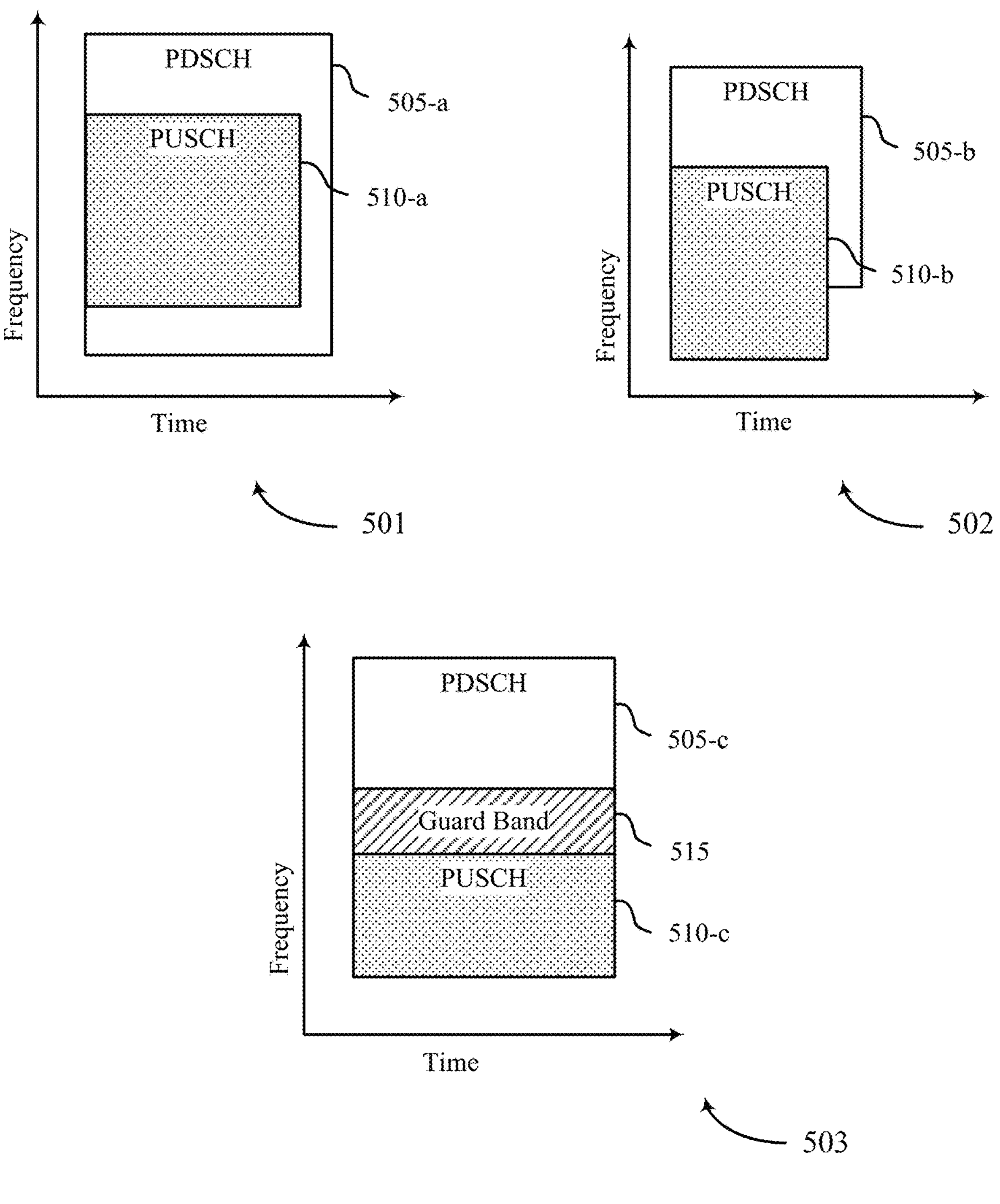
FIG. 5 illustrates examples of resource configurations that support techniques for full-duplex LBT operations in an unlicensed radio frequency spectrum in accordance with aspects of the present disclosure.

FIG. 5 illustrates examples of resource configurations 500 that support techniques for full-duplex LBT operations in an unlicensed radio frequency spectrum in accordance with aspects of the present disclosure. The resource configurations 500 may implement aspects of the wireless communications systems 100 and 200 or may be implemented by aspects of the wireless communications systems 100 and 200 as described with reference to FIGS. 1 and 2, respectively. The resource configurations 500 may illustrate resource allocations for wireless communications between a base station 105 and a UE 115, which may be examples of corresponding devices as described herein. The resource configurations 500 may include a resource configuration 501, a resource configuration 502, and a resource configuration 503. The resource configurations 500 including the resource configuration 501, the resource configuration 502, and the resource configuration 503 may be examples of resource configurations configured by the base station 105 according to a full-duplex capability of a UE 115. The resource configurations 501 and 502 illustrate examples of IBFD, while the resource configuration 503 illustrates an example of SBFD.

A base station 105 and a UE 115 may support full-duplex communications according to which the UE 115 may receive one or more downlink transmissions over a PDSCH 505 and transmit one or more uplink transmissions over a PUSCH 510 to the base station 105. Alternatively, the UE 115 may receive one or more downlink transmissions over the PDSCH 505 while a different, nearby UE 115 may transmit one or more uplink transmissions over the PUSCH 510 to the base station 105. In some examples, the UE 115 may receive an indication of the time or frequency resources in which the downlink transmission to the UE 115 overlaps in a time domain with the uplink transmission to the base station 105 and may decode the downlink transmission accordingly, which may result in a greater likelihood for successfully decoding the downlink transmission by the UE 115. In the example of the resource configuration 501, a base station 105 may allocate a PDSCH 505-*a* for downlink communication to a UE 115 and may allocate a PUSCH 510-*a* for uplink communication to the base station 105 in overlapping frequency bands, such that the UE 115 and the base station 105 may transmit and receive over the same time and frequency resources (e.g., in at least partially overlapping time and frequency resources). As described herein, a UE 115 may receive an uplink indication indicating that the PDSCH 505-*a* (e.g., the time or frequency resources of the PDSCH 505-*a*) carries a downlink transmission to the UE 115 overlapping in time with an uplink transmission to the base station 105 carried by the PUSCH 510-*a*. Accordingly, the UE 115 may determine that the downlink transmission received over the PDSCH 505-*a* was likely received in a high-interference environment and may decode the downlink transmission accordingly.

In the example of the resource configuration 502, a base station 105 may allocate a PDSCH 505-*b* for downlink communication to a UE 115 and may allocate a PUSCH 510-*b* for uplink communication to the base station 105 in overlapping frequency bands, such that the UE 115 and the base station 105 may transmit and receive on the same time and frequency resources (e.g., in at least partially overlapping time and frequency resources). As described herein, the UE 115 may receive an uplink indication indicating that the PDSCH 505-*b* (e.g., the time or frequency resources of the PDSCH 505-*b*) carries a downlink transmission to the UE 115 overlapping in time with an uplink transmission to the base station 105 carried by the PUSCH 510-*b*. Accordingly, the UE 115 may determine that the downlink transmission received over the PDSCH 505-*b* was likely received in a high-interference environment and may decode the downlink transmission accordingly.

In the example of the resource configuration 503, a base station 105 may allocate a PDSCH 505-*c* for downlink communication to a UE 115 and may allocate a PUSCH 510-*c* for uplink communication to the base station 105 in separate frequency bands, such that the UE 115 and the base station 105 may transmit and receive over overlapping time resources and different frequency resources. In some examples, the PDSCH 505-*c* and the PUSCH 510-*c* may be separated in frequency by a guard band 515. As described herein, the UE 115 may receive an uplink indication indicating that the PDSCH 505-*c* (e.g., the time or frequency resources of the PDSCH 505-*c*) carries a downlink transmission to the UE 115 overlapping in time with an uplink transmission to the base station 105 carried by the PUSCH 510-*c*. Accordingly, the UE 115 may determine that the downlink transmission received in PDSCH 505-*c* was likely received in a high-interference environment and may decode the downlink transmission accordingly.

Alternatively, the resource configurations 500 including the resource configuration 501, the resource configuration 502, and the resource configuration 503 may be examples of resource configurations for different communication types (e.g., half-duplex communication). For example, the resource configuration 501, the resource configuration 502, and the resource configuration 503 may illustrate resources that are allocated to multiple UEs 115 for communication with a base station 105. For instance, a base station 105 may allocate a PDSCH 505 for downlink transmission to one UE 115 and may allocate the PUSCH 510 for uplink transmission to the base station 105 from another UE 115.

Figure 6:
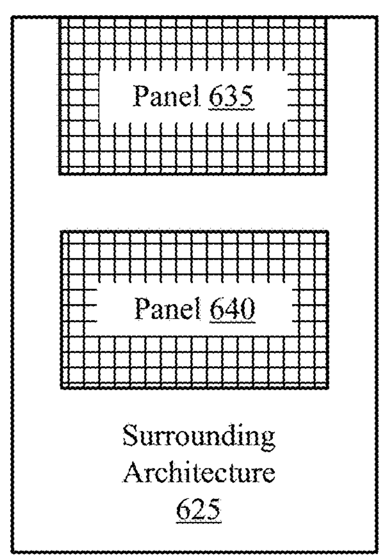
FIG. 6 illustrates an example of a radio frequency spectrum subband configuration that supports techniques for full-duplex LBT operations in an unlicensed radio frequency spectrum in accordance with aspects of the present disclosure.
Figure 6:
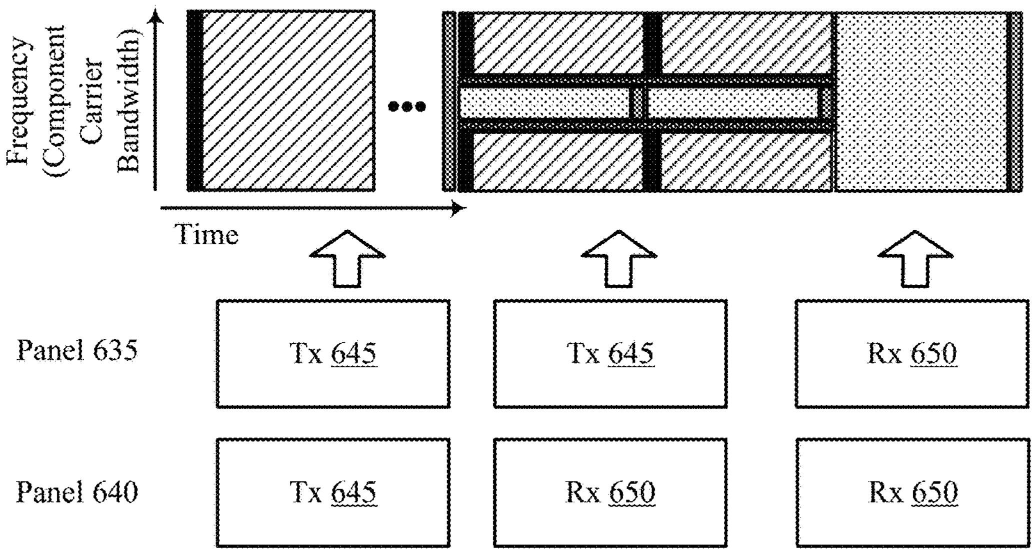
Figure 6:
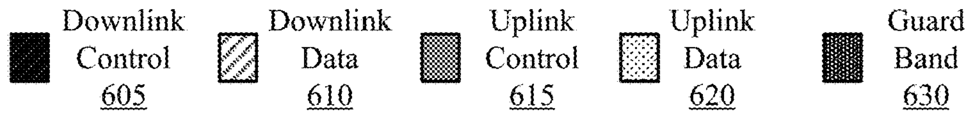

FIG. 6 illustrates an example of a radio frequency spectrum subband configuration 600 that supports techniques for full-duplex LBT operations in an unlicensed radio frequency spectrum in accordance with aspects of the present disclosure. The radio frequency spectrum subband configuration 600 may implement aspects of the wireless communications systems 100 and 200 or may be implemented by aspects of the wireless communications systems 100 and 200 as described with reference to FIGS. 1 and 2, respectively. For example, a base station 105 or a UE 115, or both, may support multiplexing operations per sub subband for paired and unpaired radio frequency spectrum subbands. The base station 105 or the UE 115, or both, may support various types of frequency ranges, such as Sub 6 GHz range (also referred to as FR1). In some cases, the base station 105 or the UE 115, or both, may support a multiplexing operation (e.g., an FDD operation, a TDD operation, or both) on time and frequency resources of radio frequency spectrum subband based on the radio frequency spectrum subband configuration 600.

A base station 105 or a UE 115, or both may support the multiplexing operation (e.g., FDD) within a component carrier bandwidth or BWP. In some examples, as described herein there may be a guard band in a frequency domain between downlink and uplink communications. For example, the base station 105 or the UE 115, or both, may support an FDD operation and a TDD operation on time and frequency resources for downlink communications (e.g., the downlink control 605, the downlink data 610) and uplink communications (e.g., the uplink control 615, the uplink data 620) in an unpaired spectrum. Additionally, there may be a guard band 630 between one or more of the downlink communications (e.g., the downlink control 605, the downlink data 610) and uplink communications (e.g., the uplink control 615, the uplink data 620). The base station 105 or the UE 115, or both, may thereby support FDD and TDD operations in an unpaired spectrum for uplink communications and downlink duplexed communications.

The base station 105 may provide downlink communications (e.g., downlink control 605, downlink data 610) using one or multiple directional beams according to the radio frequency spectrum subband configuration 600 (e.g., FDD and TDD). The UE 115 may also provide uplink communications (e.g., uplink control 615, uplink data 620) using one or multiple directional beams according to the radio frequency spectrum subband configuration 600 (e.g., FDD and TDD). The base station 105 or the UE 115, or both, may thereby support FDD and TDD operations in an unpaired spectrum for uplink and downlink duplexed communications. A UE 115 configured with the radio frequency spectrum subband configuration 600 may experience self-interference at the UE 115 as a result of simultaneous uplink and downlink communications (e.g., full-duplex communications). Self-interference may increase at the boundaries between uplink and downlink resources. To mitigate the risk of such interference, a UE 115 may perform channel access operations, such as LBT operations to avoid the self-interference.

The surrounding architecture 625, a panel 635, and a panel 640 may be located on an antenna for a wireless device, such as a base station 105, a UE 115, or the like. The panel 635 may be a transmission 645 panel (e.g., downlink transmission at both edges of a band), and the panel 635 may be a receiving 650 panel (e.g., for uplink receiving at a middle of the band). The separate panels 635 and 640 may incur benefits such as improved isolation (e.g., greater than 50 decibels (dB)) for self-interference mitigation. For SBFD, the panels 635 and 640 may incur benefits such as improved isolation (e.g., greater than 40 dB). In some examples, downlink and uplink transmission and reception may be located in different portions of a band. In some examples, there may be a guard band 630 between the uplink and downlink.

A receiving wireless device (e.g., a base station 105, a UE 115) including the surrounding architecture 625, the panels 635 and 640, or a combination, may implement windowed overlap-and-add (WOLA) to reduce an adjacent channel leakage ratio (ACLR) to the uplink signal. In some examples, a wireless device including the surrounding architecture 625, the panels 635 and 640, or a combination, may implement an analog low-pass filter (LPF) to improve an analog to digital converter (ADC) dynamic range. Further, the receiving wireless device may include improved automatic gain control (AGC) to improve a noise figure (NF) for the receiving. In some examples, a digital integrated circuit (IC) (e.g., of the ACLR leakage) may incur benefits such as improved isolation (e.g., greater than 20 dB). In some examples, the digital IC may include a non-linear mode per each transmission and reception pair.

Figure 7:
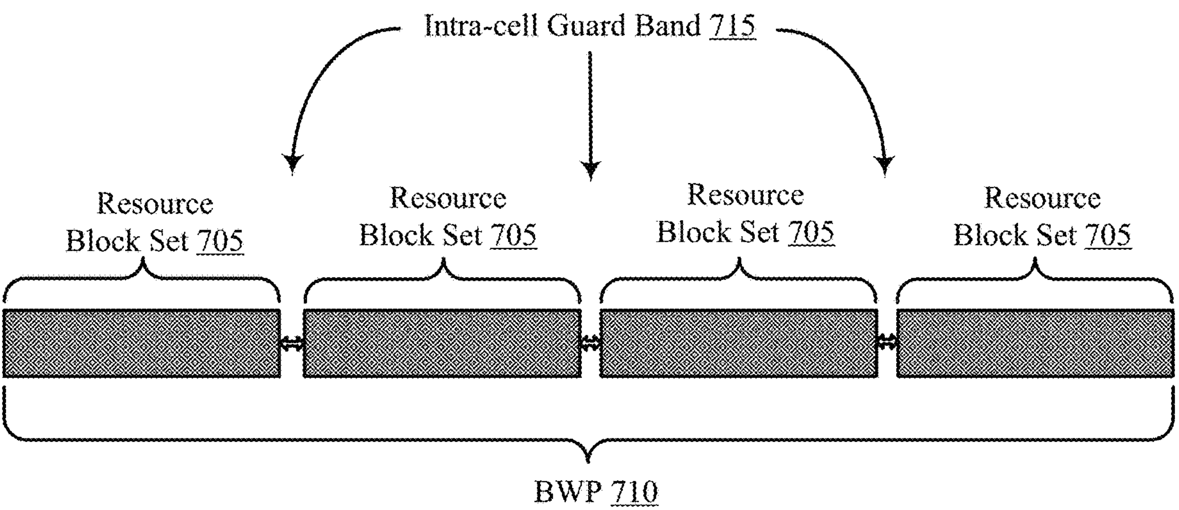
FIG. 7 illustrates an example of a frequency resource configuration that supports techniques for full-duplex LBT operations in an unlicensed radio frequency spectrum in accordance with aspects of the present disclosure.

FIG. 7 illustrates an example of a frequency resource configuration 700 that supports techniques for full-duplex LBT operations in an unlicensed radio frequency spectrum in accordance with aspects of the present disclosure. The frequency resource configuration 700 may implement aspects of the wireless communications systems 100 and 200 or may be implemented by aspects of the wireless communications systems 100 and 200 as described with reference to FIGS. 1 and 2, respectively. The frequency resource configuration 700 may illustrate resource allocations for wireless communications between a base station 105 and a UE 115, which may be examples of corresponding devices as described herein. The frequency resource configuration 700 may include one or more resource block sets 705 that span a BWP 710. As shown in FIG. 7, the frequency resource configuration 700 may include an intra-cell guard band 715 between adjacent resource block sets.

A base station 105 and a UE 115 may operate in a shared radio frequency spectrum band (e.g., an unlicensed frequency spectrum band) that shares a spectrum with other radio access technologies (e.g., an NR-U system, a Wi-Fi system) or between wireless communication systems, or both. For example, the base station 105 and the UE 115 may communicate using the NR-U system, which may share a frequency spectrum band (e.g., the 5 GHz and 6 GHz band) with the Wi-Fi system. In some cases, a device or node operating in the unlicensed frequency spectrum band, such as the UE 115, may perform an unlicensed channel access procedure to determine whether one or more resources (e.g., frequency resources) are available for a transmission. For example, the UE 115 may perform an LBT procedure across one or more resource blocks that make up a frequency spectrum band (e.g., using 20 MHz as a basic channel access unit for the NR-U system, the Wi-Fi system, or both), which may be referred to as an LBT bandwidth or a resource block set 705.

A BWP 710 (e.g., a BWP configured for the UE 115) of the unlicensed frequency band may include one or more resource block sets 705. The resource block set 705 may be derived separately for downlink and uplink based on control signaling (e.g., intra-cell guard band 715 signaling). For example, the UE 115 may receive control signaling from the base station 105, such as RRC signaling, including an intra-cell guard band 715 configuration, which may specify the frequency between each resource block set 705 in the BWP 710. The intra-cell guard band 715 configuration may include one or more parameters, such as a parameter for transmitting an uplink transmission (e.g., intraCellGuardBandUL), a parameter for receiving a downlink transmission (e.g., intraCellGuardBandDL), or both. In some cases, such as when the base station 105 or the UE 115 is performing an all or nothing transmission, the intra-cell guard band 715 may have a value of zero.

A UE 115 may perform an LBT procedure across the resource block set(s) 705 corresponding to the uplink grant to verify that operation (e.g., receiving or transmitting) is not interrupted. For example, the UE 115 may sense a channel energy by detecting energy in the LBT bandwidth (e.g., the resource block set 705). If the detected energy is less than a threshold, the channel is available. The UE 115 may use the channel for a transmission. If the detected energy is greater than the threshold, the channel is unavailable. In some examples, the base station 105 may configure the UE 115 with the threshold via RRC signaling, a MAC-CE, a DCI message or some other control signaling. In some other examples, the UE 115 may otherwise determine the threshold (e.g., based on a predetermined value at the UE 115). If the channel is busy, the UE 115 may refrain from transmitting using the resource block set 705 corresponding to the uplink grant even if resource block sets 705 other than those corresponding to the uplink grant are available for the uplink transmission (e.g., the uplink grant may have corresponded to two resource block sets 705 of a BWP that were unavailable, but the UE 115 may have had two other resource block sets 705 in the BWP that were available). The UE 115 may perform an additional one or more LBT procedures at later times until the channel is available.

FIG. 8 illustrates examples of transmission timelines 800 that support techniques for full-duplex LBT operations in an unlicensed radio frequency spectrum in accordance with aspects of the present disclosure. The transmission timelines 800 may implement aspects of the wireless communications systems 100 and 200 or may be implemented by aspects of the wireless communications systems 100 and 200 as described with reference to FIGS. 1 and 2, respectively. The transmission timelines 800 may illustrate wireless communications between a base station 105 and a UE 115, which may be examples of corresponding devices as described herein. In some examples, the transmission timelines 800 may illustrate examples of LBT procedures for sensing channel energy as represented in the time domain. For example, the transmission timelines 800 may include an LBT timeline 801 and an LBT timeline 802, which may provide examples of timelines within load-based equipment (LBE) channels.

LBT procedures may have multiple different types. For example, LBT procedures may include category (Cat) 4 LBT, which may be referred to as Type 1. In some cases, Cat 4 LBT may include a contention window, which may be a window of time during which a network or one or more devices may be in a contention mode. In some other examples, LBT procedures may include Cat 2 LBT with a 25 microsecond gap, which may be referred to as Type 2A, and Cat 2 LBT with a 16 microsecond gap, which may be referred to as Type 2B. The LBT timeline 801 may be an example of the Cat 2 LBT with the 25 microsecond gap, and the LBT timeline 802 may be an example of the Cat 2 LBT with the 16 microsecond gap. In some other examples, LBT procedures may include Cat 1 LBT with no more than a 16 microsecond gap without channel sensing, which may be referred to as Type 2C. Cat 1 LBT procedures may include a transmission burst length limit of 0.584 ms.

LBE channels may be examples of channels where transmissions over the LBE channels are load-dependent. For example, LBE channels may support less regulated transmissions than FBE channels do. For example, a UE 115 may transmit over an LBE channel when a load is to be transmitted. In some examples, devices transmitting over LBE channels may use Cat 4 LBT, and may use Cat 2 LBT when transmitting within a channel occupancy time (COT). In some cases, a UE 115 may use Cat 2 LBT for discovery reference signal (DRS) transmissions when no unicast data is included in the transmission, the transmission duration is no longer than 1 ms, and the duty cycle of the transmission is no more than 1/20.

The LBT timelines 801 and 802 may include sensing energy 805 for a duration of time (e.g., 4 microseconds, 5 microseconds, or other durations of time). LBT timelines 801 and 802 may depict that a UE 115 may transmit an uplink transmission after sensing energy 805 for a duration of time and after waiting for another duration of time before transmission. For example, in the LBT timeline 802, which may be an example of a 16 microsecond Cat 2 LBT procedure, the UE 115 may sense energy 805 for 5 microseconds and may wait for 9 microseconds minus 5 microseconds (e.g., 4 microseconds) before transmitting the uplink transmission.

Figure 9:
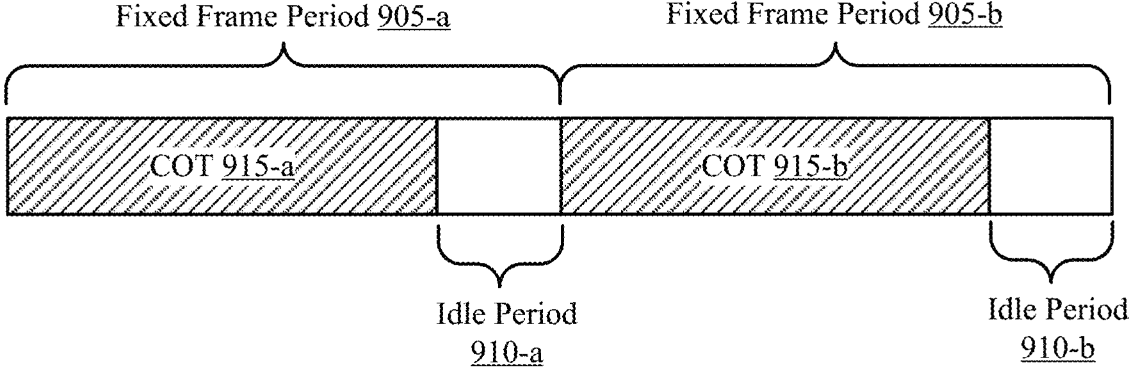
FIG. 9 illustrates an example of a frame-based equipment (FBE) channel access timeline that supports techniques for full-duplex LBT operations in an unlicensed radio frequency spectrum in accordance with aspects of the present disclosure.

FIG. 9 illustrates an example of a frame-based equipment (FBE) channel access timeline 900 that supports techniques for full-duplex LBT operations in an unlicensed radio frequency spectrum in accordance with aspects of the present disclosure. The FBE channel access timeline 900 may implement aspects of the wireless communications systems 100 and 200 or may be implemented by aspects of the wireless communications systems 100 and 200 as described with reference to FIGS. 1 and 2, respectively. For example, the FBE channel access timeline 900 may implement LBT procedures as described herein.

A UE 115 may support an FBE mode (e.g., in industrial internet of things (IIoT) environments, in controlled environments with low interference from surrounding signals, such as Wi-Fi signals, or both). In some examples, the UE 115 may support the FBE mode in NR-U for better quality of service (QoS) for ultra-reliable low latency communications, among other communication types. For example, the UE 115 may contend for a channel using Cat 2 LBT in accordance with a fixed time grid (e.g., a fixed frame period 905 may be configured to a quantity of time, including an idle period 910, as described herein and a component of the UE 115 may attempt to obtain a COT 915 at the beginning of each fixed frame period 905). In some other examples, a UE 115 may contend for transmission over a channel within a fixed frame period 905 if the UE 115 detects downlink signals or channels (e.g., PDCCH, SSB, PBCH<RMSI, GC-PDCCH, or the like) within the fixed frame period 905.

Figure 10:
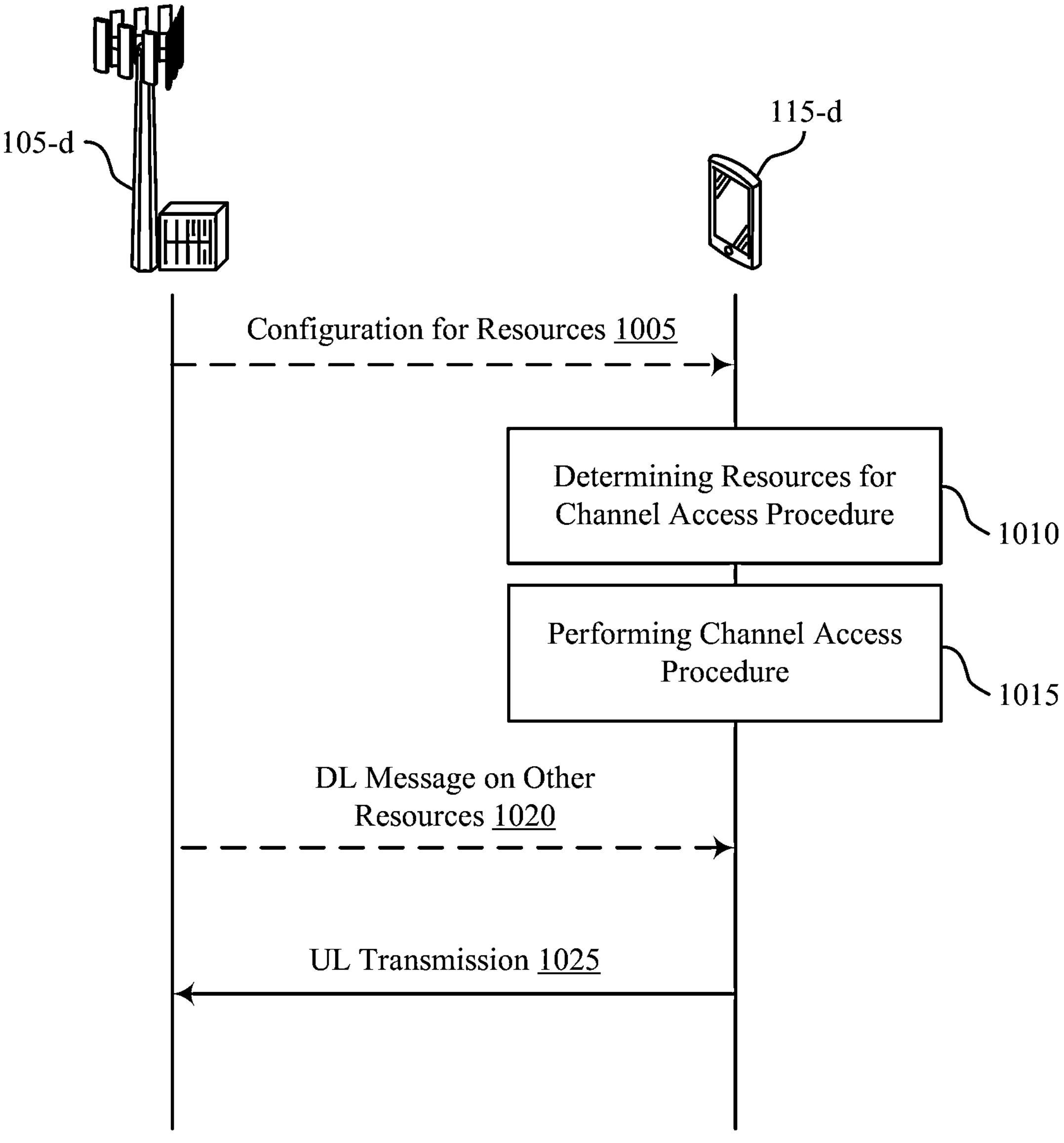
FIG. 10 illustrates an example of a process flow that supports techniques for full-duplex LBT operations in an unlicensed radio frequency spectrum in accordance with aspects of the present disclosure.

The FBE mode may be referred to as semi-static channel access procedures, and the UE 115 may be configured to use semi-static channel access procedures to obtain COT 915, such as by performing LBT procedures in accordance with a fixed frame period 905 configuration. In cases where the UE 115 does not use a Cat 4 LBT procedure, channel access times may be associated with lower levels of uncertainty. In some examples, a UE 115 may announce an FBE mode in a remaining minimum system information (RMSI) transmission. In some examples, the RMSI transmission may include a configuration for a fixed frame period 905 (e.g., for a channel access opportunity, for COT 915 in the fixed frame period 905, and the like). In some cases, a base station 105 may signal (via RRC signaling, a DCI message, a MAC-CE, or the like) for the UE 115 to use the FBE mode. FIG. 10 illustrates an example of a process flow 1000 that supports techniques for full-duplex LBT operations in an unlicensed radio frequency spectrum in accordance with aspects of the present disclosure. The process flow 1000 may implement aspects of the wireless communications systems 100 and 200 or may be implemented by aspects of the wireless communications system 100 and 200 as described with reference to FIGS. 1 and 2, respectively. For example, the process flow 1000 may be based on a configuration by a base station 105-*d*, which may be implemented by a UE 115-*d*. The base station 105-*d* and the UE 115-*d* may be examples of a base station 105 and a UE 115, as described with reference to FIGS. 1 and 2. In the following description of the process flow 1000, the operations between the base station 105-*d* and the UE 115-*d* may be transmitted in a different order than the example order shown, or the operations performed by the base station 105-*d* and the UE 115-*d* may be performed in different orders or at different times. Some operations may also be omitted from the process flow 1000, and other operations may be added to the process flow 1000.

At 1005, UE 115-*d* may receive a configuration of a set of resources for a channel access procedure. In some cases, UE 115-*d* may receive the configuration via RRC signaling, a DCI message, a MAC-CE, or the like. In some cases, the set of resources for the channel access procedure may include ZP-RS resources, reserved resources, or both.

At 1010, UE 115-*d* may determine a set of resources for a channel access procedure in a shared radio spectrum band, where the set of resources includes one or more zero-power reference signal resources, one or more reserved channel access resources, or both. In some cases, the set of resources for the channel access procedure may include ZP-RS resources, reserved resources, or both. In some cases, UE 115-*d* may be pre-configured with the set of resources for the channel access procedure.

At 1015, UE 115-*d* may perform, while operating in a full duplex mode and during a duration in which UE 115-*d* has not been scheduled to receive any downlink transmission, the channel access procedure on the set of resources for a channel in a shared radio frequency spectrum band. In some cases, the channel access procedure may be an LBT procedure. In some cases, UE 115-*d* may perform the channel access procedure on resources that fully overlap with the ZP-RS resources or the reserved resources, or partially overlap with the ZP-RS resources or reserved resources.

At 1020, UE 115-*d* may receive a downlink transmission on a second set of resources. In some cases, UE 115-*d* may receive the downlink transmission on the second set of resources different from the first set of resources associated with the ZP-RS resources, reserved resources or both. The UE 115-*d* may be able to transmit uplink transmissions on the ZP-RS resources or reserved resources, and may be able to receive the downlink transmission on the second set of resources within a same frame or subframe as the transmitting.

Figure 11:
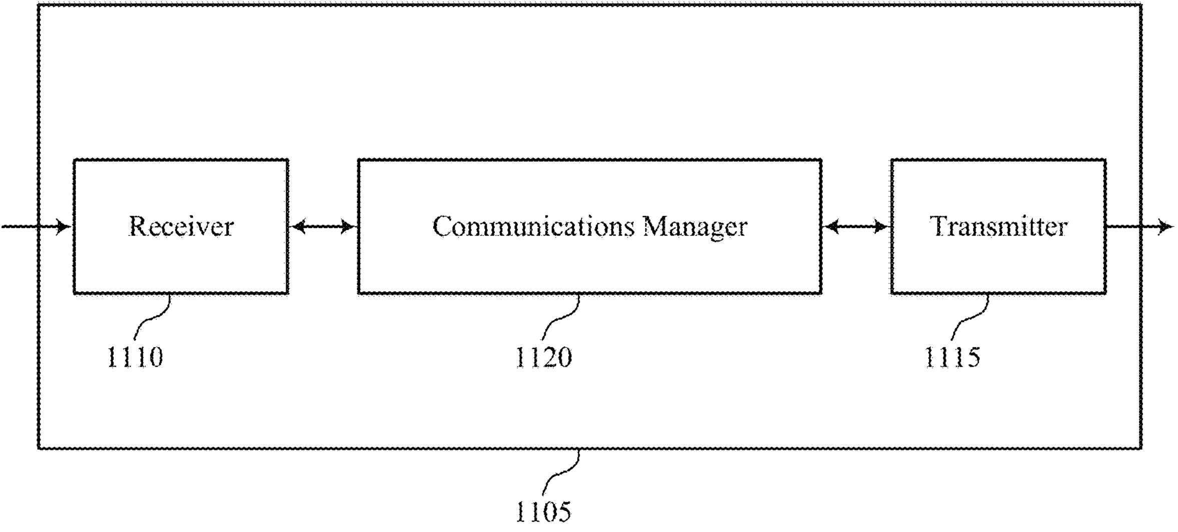
FIGS. 11 and 12 show block diagrams of devices that support techniques for full-duplex LBT operations in an unlicensed radio frequency spectrum in accordance with aspects of the present disclosure.

FIG. 11 shows a block diagram 1100 of a device 1105 that supports techniques for full-duplex LBT operations in an unlicensed radio frequency spectrum in accordance with aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for full-duplex LBT operations in an unlicensed radio frequency spectrum). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for full-duplex LBT operations in an unlicensed radio frequency spectrum). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for full-duplex LBT operations in an unlicensed radio frequency spectrum as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at the device 1105 (e.g., a UE) in accordance with examples as disclosed herein. For example, the communications manager 1120 may be configured as or otherwise support a means for determining a set of resources for a channel access procedure in a shared radio frequency spectrum band, the set of resources including one or more ZP-RS resources, one or more reserved channel access resources, or both. The communications manager 1120 may be configured as or otherwise support a means for performing, while operating in a full duplex mode and during a duration in which the device 1105 (e.g., the UE) has not been scheduled to receive any downlink transmission, the channel access procedure on the set of resources for a channel in the shared radio frequency spectrum band. The communications manager 1120 may be configured as or otherwise support a means for transmitting an uplink transmission over the channel based on the channel access procedure. By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced power consumption and more efficient utilization of communication resources by enabling efficient channel access procedures for a channel in a shared radio frequency spectrum band.

Figure 12:
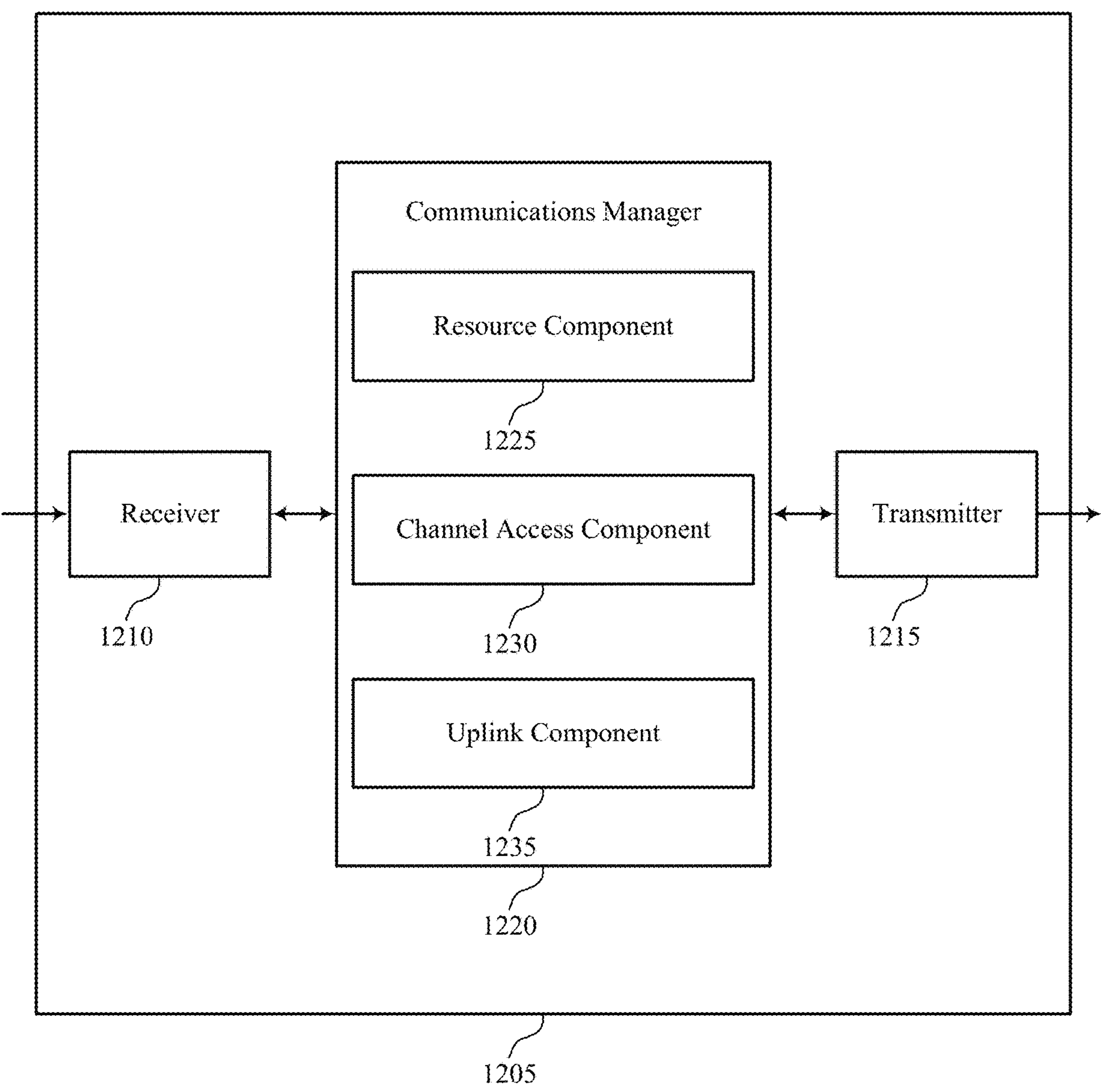

FIG. 12 shows a block diagram 1200 of a device 1205 that supports techniques for full-duplex LBT operations in an unlicensed radio frequency spectrum in accordance with aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for full-duplex LBT operations in an unlicensed radio frequency spectrum). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for full-duplex LBT operations in an unlicensed radio frequency spectrum). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for full-duplex LBT operations in an unlicensed radio frequency spectrum as described herein. For example, the communications manager 1220 may include a resource component 1225, a channel access component 1230, an uplink component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at the device 1205 (e.g., a UE) in accordance with examples as disclosed herein. The resource component 1225 may be configured as or otherwise support a means for determining a set of resources for a channel access procedure in a shared radio frequency spectrum band, the set of resources including one or more ZP-RS resources, one or more reserved channel access resources, or both. The channel access component 1230 may be configured as or otherwise support a means for performing, while operating in a full duplex mode and during a duration in which the device 1205 (e.g., the UE) has not been scheduled to receive any downlink transmission, the channel access procedure on the set of resources for a channel in the shared radio frequency spectrum band. The uplink component 1235 may be configured as or otherwise support a means for transmitting an uplink transmission over the channel based on the channel access procedure.

Figure 13:
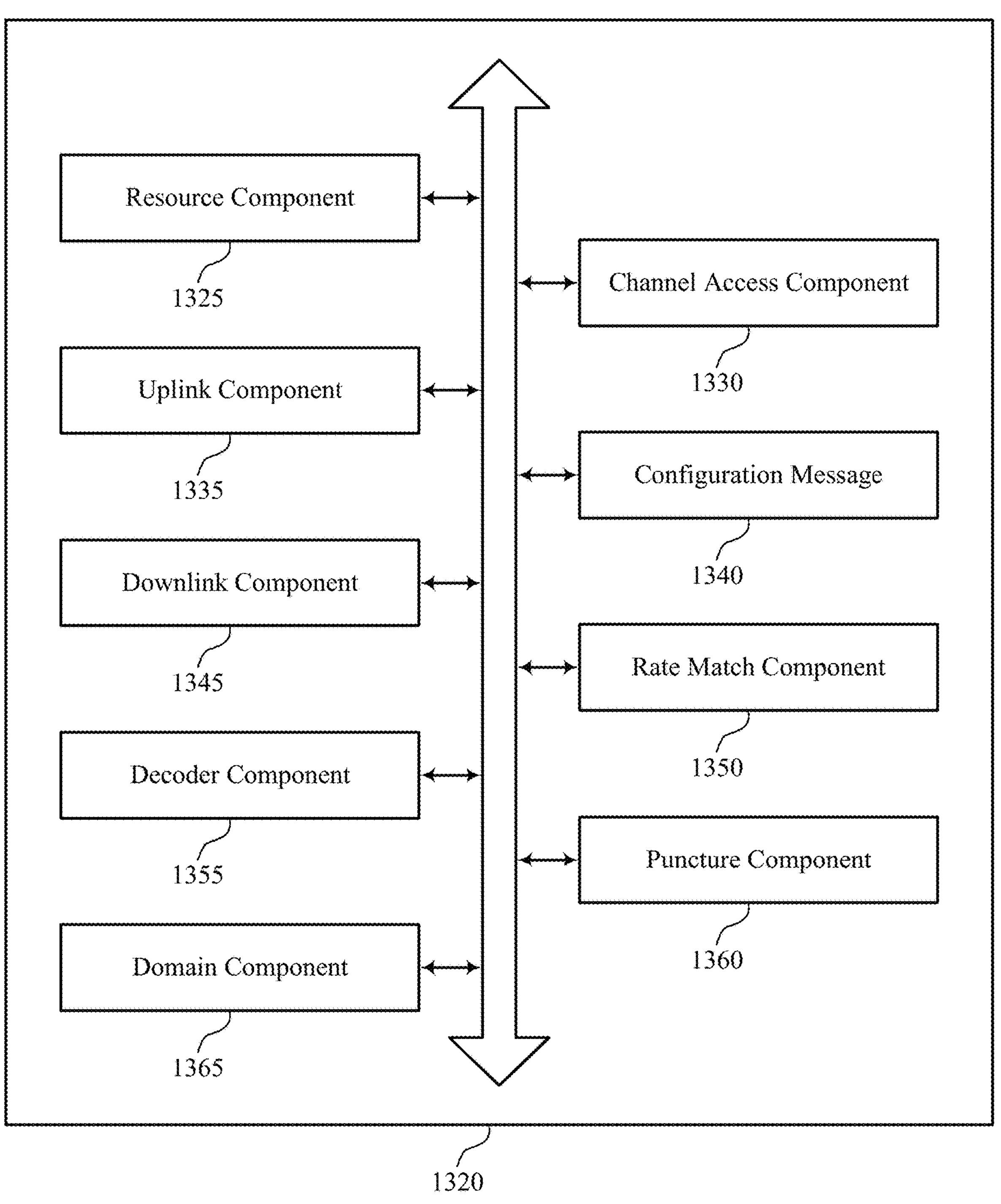
FIG. 13 shows a block diagram of a communications manager that supports techniques for full-duplex LBT operations in an unlicensed radio frequency spectrum in accordance with aspects of the present disclosure.

FIG. 13 shows a block diagram 1300 of a communications manager 1320 that supports techniques for full-duplex LBT operations in an unlicensed radio frequency spectrum in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for full-duplex LBT operations in an unlicensed radio frequency spectrum as described herein. For example, the communications manager 1320 may include a resource component 1325, a channel access component 1330, an uplink component 1335, a configuration message 1340, a downlink component 1345, a rate match component 1350, a decoder component 1355, a puncture component 1360, a domain component 1365, or any combination thereof. Each of these components may communicate, directly or indirectly, with one another (e.g., via one or more buses).

The communications manager 1320 may support wireless communication at a UE in accordance with examples as disclosed herein. The resource component 1325 may be configured as or otherwise support a means for determining a set of resources for a channel access procedure in a shared radio frequency spectrum band, the set of resources including one or more ZP-RS resources, one or more reserved channel access resources, or both. The channel access component 1330 may be configured as or otherwise support a means for performing, while operating in a full duplex mode and during a duration in which the UE has not been scheduled to receive any downlink transmission, the channel access procedure on the set of resources for a channel in the shared radio frequency spectrum band. The uplink component 1335 may be configured as or otherwise support a means for transmitting an uplink transmission over the channel based on the channel access procedure.

The configuration message 1340 may be configured as or otherwise support a means for receiving, from a base station, an RRC message including a configuration of the set of resources for the channel access procedure. In some examples, the resource component 1325 may be configured as or otherwise support a means for determining the set of resources for the channel access procedure based on the RRC message. In some examples, the RRC message includes an RRC IE indicating the set of resources for the channel access procedure in the shared radio frequency spectrum band. In some examples, the channel access procedure includes an LBT procedure.

The resource component 1325 may be configured as or otherwise support a means for determining the set of resources for the channel access procedure in at least a time domain based on the configuration. In some examples, the channel access component 1330 may be configured as or otherwise support a means for performing the channel access procedure based on the set of resources in at least the time domain. In some examples, the resource component 1325 may be configured as or otherwise support a means for identifying a bitmap indicating the set of resources in at least the time domain based on the configuration, the set of resources including one or more OFDM symbols in the time domain. In some examples, the channel access component 1330 may be configured as or otherwise support a means for performing the channel access procedure based on the bitmap indicating the set of resources in at least the time domain.

In some examples, the resource component 1325 may be configured as or otherwise support a means for identifying, based on the configuration, a beginning symbol of the set of resources in at least the time domain, an ending symbol of the set of resources in at least the time domain, or a length of the set of resources in at least the time domain, or any combination thereof. In some examples, the channel access component 1330 may be configured as or otherwise support a means for performing the channel access procedure based on the beginning symbol of the set of resources in at least the time domain, the ending symbol of the set of resources in at least the time domain, or the length of the set of resources in at least the time domain, or the combination thereof.

The configuration message 1340 may be configured as or otherwise support a means for determining a periodicity of the set of resources based on the configuration. In some examples, the channel access component 1330 may be configured as or otherwise support a means for performing the channel access procedure based on the periodicity of the set of resources. In some examples, the resource component 1325 may be configured as or otherwise support a means for determining a symbol boundary or a slot boundary, or both, associated with the set of resources in at least a time domain based on the configuration. In some examples, the channel access component 1330 may be configured as or otherwise support a means for performing the channel access procedure based on the symbol boundary, or the slot boundary, or both, associated with the set of resources in at least the time domain.

In some examples, the resource component 1325 may be configured as or otherwise support a means for determining, based on the configuration, a resource pattern of the set of resources in at least a time domain, or at least a frequency domain, or both, where the set of resources are aperiodic based on the resource pattern. In some examples, the channel access component 1330 may be configured as or otherwise support a means for performing the channel access procedure based on the resource pattern of the set of resources in at least the time domain, or in at least the frequency domain, or both.

The downlink component 1345 may be configured as or otherwise support a means for receiving, from a base station, a DCI message, or a MAC-CE message, or both, including an indication of the set of resources for the channel access procedure in the shared radio frequency spectrum band. In some examples, the channel access component 1330 may be configured as or otherwise support a means for determining the set of resources for the channel access procedure based on the DCI message, or the MAC-CE message, or both. In some examples, the domain component 1365 may be configured as or otherwise support a means for determining timing information, or frequency information, both, associated with the set of resources based on the indication. In some examples, the resource component 1325 may be configured as or otherwise support a means for determining the set of resources for the channel access procedure based on the timing information or frequency information, both, associated with the set of resources.

The resource component 1325 may be configured as or otherwise support a means for activating one or more resources of the set of resources based on the indication. In some examples, the channel access component 1330 may be configured as or otherwise support a means for performing the channel access procedure based on the activating of the one or more resources of the set of resources. In some examples, the resource component 1325 may be configured as or otherwise support a means for deactivating one or more resources of the set of resources based on the indication. In some examples, the channel access component 1330 may be configured as or otherwise support a means for performing the channel access procedure based on the deactivating of the one or more resources of the set of resources.

In some examples, the resource component 1325 may be configured as or otherwise support a means for selecting one or more resources of the set of resources based on the indication. In some examples, the channel access component 1330 may be configured as or otherwise support a means for performing the channel access procedure based on the selecting of the one or more resources of the set of resources. The resource component 1325 may be configured as or otherwise support a means for determining an overlap between the set of resources and a channel access occasion associated with the channel access procedure in a time domain, or a frequency domain, or both. In some examples, the channel access component 1330 may be configured as or otherwise support a means for terminating the channel access procedure based on the overlap between the set of resources and the channel access occasion associated with the channel access procedure.

In some examples, the resource component 1325 may be configured as or otherwise support a means for determining an overlap between the set of resources and a channel access occasion associated with the channel access procedure in a time domain, or a frequency domain, or both. In some examples, the channel access component 1330 may be configured as or otherwise support a means for adjusting a channel access parameter based on the overlap between the set of resources and the channel access occasion associated with the channel access procedure. In some examples, the channel access component 1330 may be configured as or otherwise support a means for performing the channel access procedure based on the adjusting of the channel access parameter.

The downlink component 1345 may be configured as or otherwise support a means for receiving, from a base station, a downlink transmission on a second set of resources. In some examples, the rate match component 1350 may be configured as or otherwise support a means for rate matching the second set of resources around the set of resources. In some examples, the decoder component 1355 may be configured as or otherwise support a means for decoding the downlink transmission based on the rate matching of the second set of resources.

The downlink component 1345 may be configured as or otherwise support a means for receiving, from a base station, a downlink transmission on a second set of resources. In some examples, the puncture component 1360 may be configured as or otherwise support a means for puncturing the second set of resources based on the set of resources. In some examples, the decoder component 1355 may be configured as or otherwise support a means for decoding the downlink transmission based on the puncturing of the second set of resources.

The downlink component 1345 may be configured as or otherwise support a means for receiving, from a base station, a downlink transmission on a second set of resources. In some examples, the resource component 1325 may be configured as or otherwise support a means for determining that an overlap between the set of resources and the second set of resources satisfies a threshold. The second set of resources includes downlink resources. In some examples, the decoder component 1355 may be configured as or otherwise support a means for refraining from decoding the downlink transmission based on the determining of the overlap between the set of resources and the second set of resources satisfying the threshold.

Figure 14:
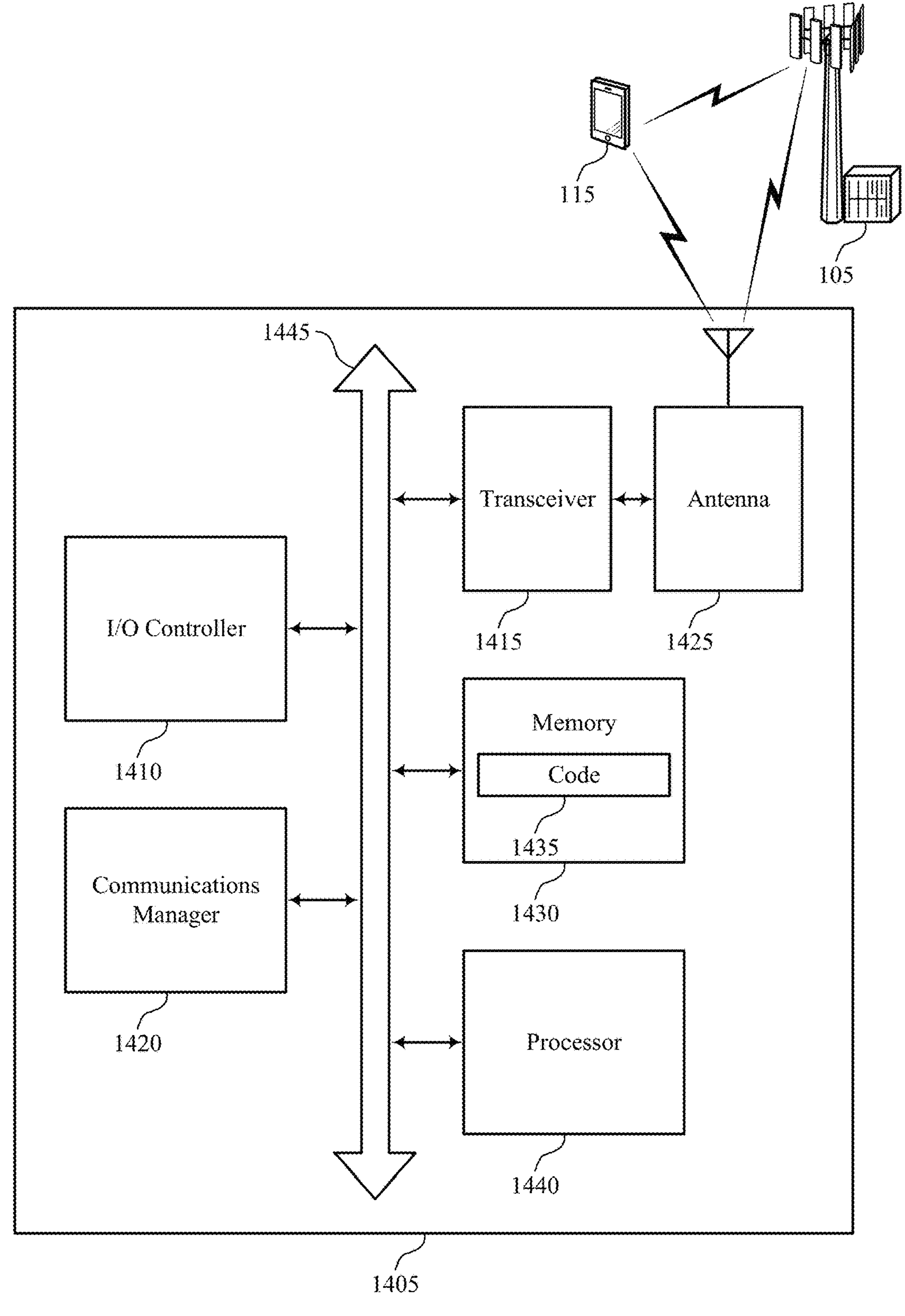
FIG. 14 shows a diagram of a system including a device that supports techniques for full-duplex LBT operations in an unlicensed radio frequency spectrum in accordance with aspects of the present disclosure.

FIG. 14 shows a diagram of a system 1400 including a device 1405 that supports techniques for full-duplex LBT operations in an unlicensed radio frequency spectrum in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for full-duplex LBT operations in an unlicensed radio frequency spectrum). For example, the device 1405 or a component of the device 1405 may include a processor 1440 and memory 1430 coupled to the processor 1440, the processor 1440 and memory 1430 configured to perform various functions described herein.

The communications manager 1420 may support wireless communication at the device 1405 (e.g., a UE) in accordance with examples as disclosed herein. For example, the communications manager 1420 may be configured as or otherwise support a means for determining a set of resources for a channel access procedure in a shared radio frequency spectrum band, the set of resources including one or more ZP-RS resources, one or more reserved channel access resources, or both. The communications manager 1420 may be configured as or otherwise support a means for performing, while operating in a full duplex mode and during a duration in which the device 1405 (e.g., the UE) has not been scheduled to receive any downlink transmission, the channel access procedure on the set of resources for a channel in the shared radio frequency spectrum band. The communications manager 1420 may be configured as or otherwise support a means for transmitting an uplink transmission over the channel based on the channel access procedure. By including or configuring the communications manager 1420 in accordance with examples as described herein, the device 1405 may support techniques for improved communication reliability, reduced latency, reduced power consumption, more efficient utilization of communication resources, and longer battery life.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for full-duplex LBT operations in an unlicensed radio frequency spectrum as described herein, or the processor 1440 and the memory 1430 may be otherwise configured to perform or support such operations.

Figure 15:
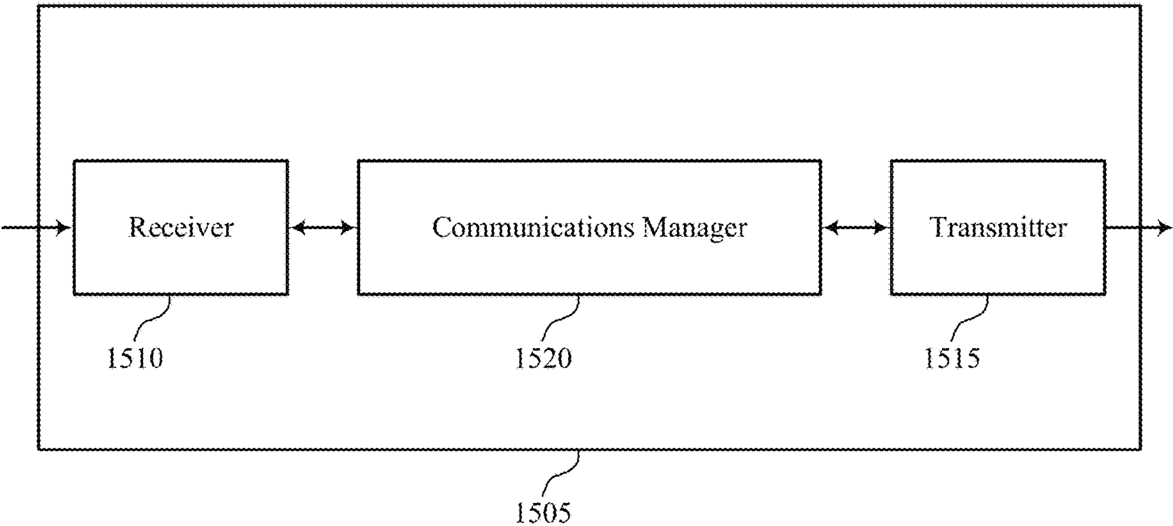
FIGS. 15 and 16 show block diagrams of devices that support techniques for full-duplex LBT operations in an unlicensed radio frequency spectrum in accordance with aspects of the present disclosure.

FIG. 15 shows a block diagram 1500 of a device 1505 that supports techniques for full-duplex LBT operations in an unlicensed radio frequency spectrum in accordance with aspects of the present disclosure. The device 1505 may be an example of aspects of a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to techniques for full-duplex LBT operations in an unlicensed radio frequency spectrum). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to techniques for full-duplex LBT operations in an unlicensed radio frequency spectrum). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of techniques for full-duplex LBT operations in an unlicensed radio frequency spectrum as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1520, the receiver 1510, the transmitter 1515, or various combinations or components thereof may be implemented in code (e.g., as communications management software or firmware) executed by a processor. If implemented in code executed by a processor, the functions of the communications manager 1520, the receiver 1510, the transmitter 1515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1520 may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at the device 1505 (e.g., a base station) in accordance with examples as disclosed herein. For example, the communications manager 1520 may be configured as or otherwise support a means for determining a set of resources for a channel access procedure in a shared radio frequency spectrum band, the set of resources including one or more ZP-RS resources, one or more reserved channel access resources, or both. The communications manager 1520 may be configured as or otherwise support a means for transmitting, to a UE, an RRC message including a configuration of the set of resources for the channel access procedure, where a period associated with the channel access procedure includes a duration in which the base station has not scheduled the UE to receive any downlink transmission. By including or configuring the communications manager 1520 in accordance with examples as described herein, the device 1505 (e.g., a processor controlling or otherwise coupled to the receiver 1510, the transmitter 1515, the communications manager 1520, or a combination thereof) may support techniques for reduced processing, reduced power consumption, more efficient utilization of communication resources.

Figure 16:
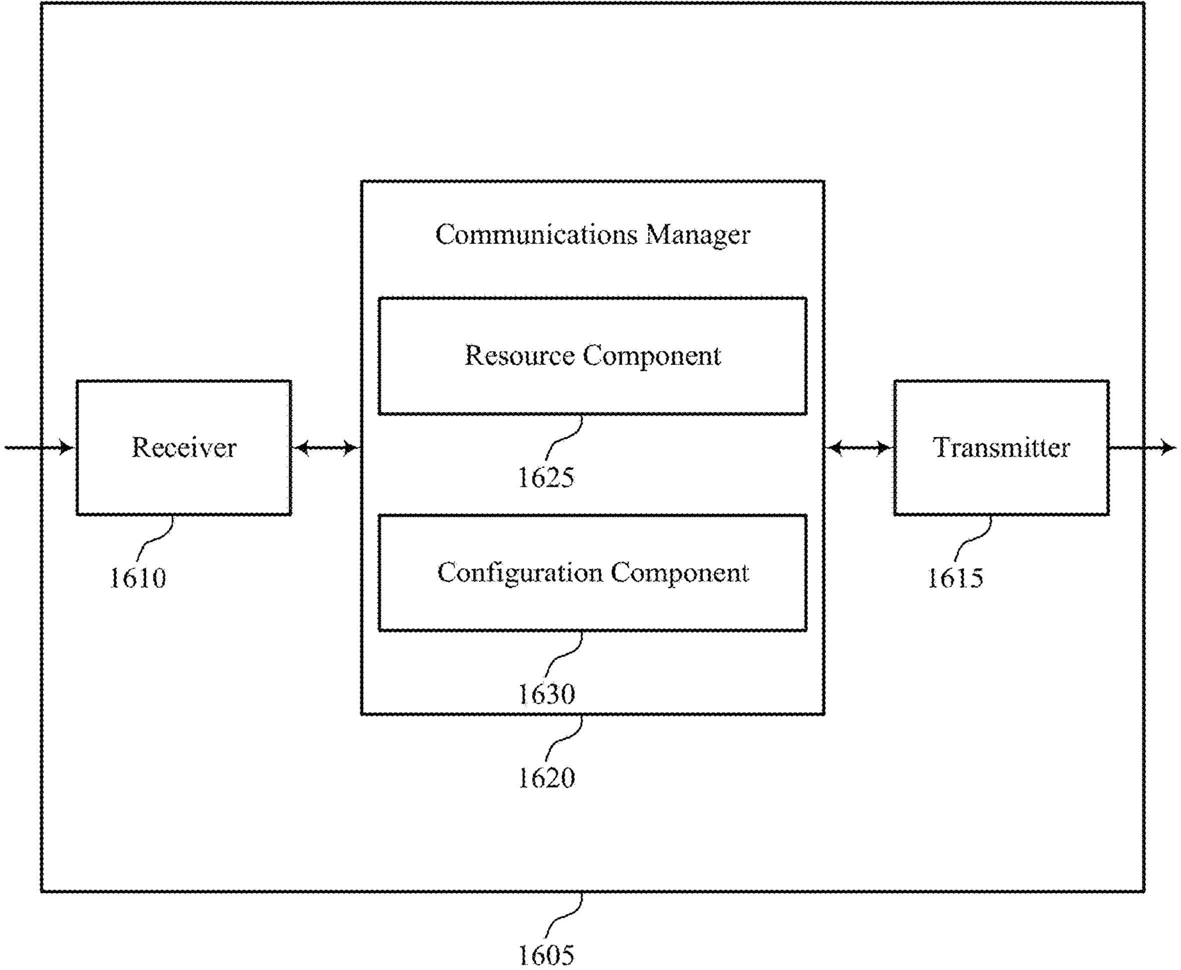

FIG. 16 shows a block diagram 1600 of a device 1605 that supports techniques for full-duplex LBT operations in an unlicensed radio frequency spectrum in accordance with aspects of the present disclosure. The device 1605 may be an example of aspects of a device 1505 or a base station 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to techniques for full-duplex LBT operations in an unlicensed radio frequency spectrum). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to techniques for full-duplex LBT operations in an unlicensed radio frequency spectrum). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of techniques for full-duplex LBT operations in an unlicensed radio frequency spectrum as described herein. For example, the communications manager 1620 may include a resource component 1625 a configuration component 1630, or any combination thereof. The communications manager 1620 may be an example of aspects of a communications manager 1520 as described herein. In some examples, the communications manager 1620, or various components thereof, may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communication at the device 1605 (e.g., a base station) in accordance with examples as disclosed herein. The resource component 1625 may be configured as or otherwise support a means for determining a set of resources for a channel access procedure in a shared radio frequency spectrum band, the set of resources including one or more ZP-RS resources, one or more reserved channel access resources, or both. The configuration component 1630 may be configured as or otherwise support a means for transmitting, to a UE, an RRC message including a configuration of the set of resources for the channel access procedure, where a period associated with the channel access procedure includes a duration in which the base station has not scheduled the UE to receive any downlink transmission.

Figure 17:
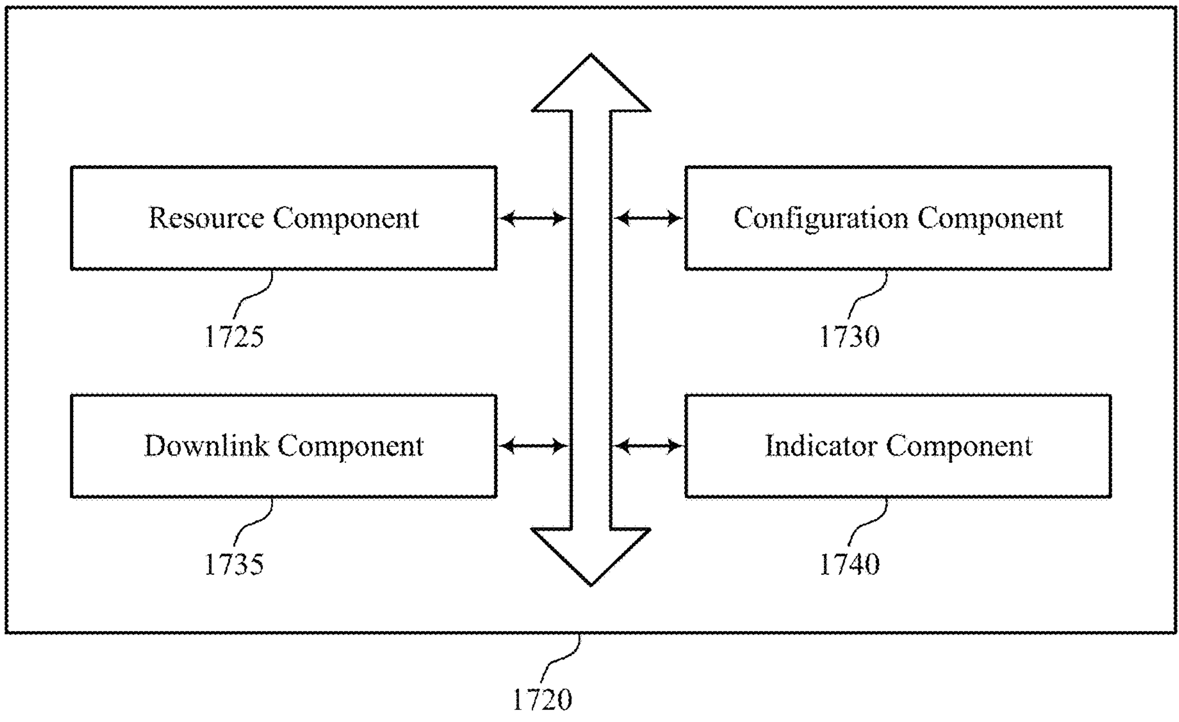
FIG. 17 shows a block diagram of a communications manager that supports techniques for full-duplex LBT operations in an unlicensed radio frequency spectrum in accordance with aspects of the present disclosure.
Figure 17:

FIG. 17 shows a block diagram 1700 of a communications manager 1720 that supports techniques for full-duplex LBT operations in an unlicensed radio frequency spectrum in accordance with aspects of the present disclosure. The communications manager 1720 may be an example of aspects of a communications manager 1520, a communications manager 1620, or both, as described herein. The communications manager 1720, or various components thereof, may be an example of means for performing various aspects of techniques for full-duplex LBT operations in an unlicensed radio frequency spectrum as described herein. For example, the communications manager 1720 may include a resource component 1725, a configuration component 1730, a downlink component 1735, an indicator component 1740, or any combination thereof. Each of these components may communicate, directly or indirectly, with one another (e.g., via one or more buses).

The communications manager 1720 may support wireless communication at a base station in accordance with examples as disclosed herein. The resource component 1725 may be configured as or otherwise support a means for determining a set of resources for a channel access procedure in a shared radio frequency spectrum band, the set of resources including one or more ZP-RS resources, one or more reserved channel access resources, or both. The configuration component 1730 may be configured as or otherwise support a means for transmitting, to a UE, an RRC message including a configuration of the set of resources for the channel access procedure, where a period associated with the channel access procedure includes a duration in which the base station has not scheduled the UE to receive any downlink transmission.

In some examples, the configuration includes a bitmap indicating the set of resources in at least a time domain based on the configuration, the set of resources including one or more OFDM symbols in the time domain. In some examples, the configuration includes a beginning symbol of the set of resources in at least a time domain, an ending symbol of the set of resources in at least the time domain, or a length of the set of resources in at least the time domain, or any combination thereof. In some examples, the configuration includes a periodicity of the set of resources. In some examples, the configuration includes a symbol boundary or a slot boundary associated with the set of resources in at least a time domain.

The downlink component 1735 may be configured as or otherwise support a means for transmitting, to the UE, a DCI message, or a MAC-CE message, or both, including an indication of the set of resources for the channel access procedure in the shared radio frequency spectrum band. In some examples, the resource component 1725 may be configured as or otherwise support a means for transmitting, to the UE, an indication to activate or deactivate one or more resources of the set of resources for the channel access procedure. In some examples, the indicator component 1740 may be configured as or otherwise support a means for transmitting, to the UE, an indication to select one or more resources of the set of resources for the channel access procedure.

Figure 18:
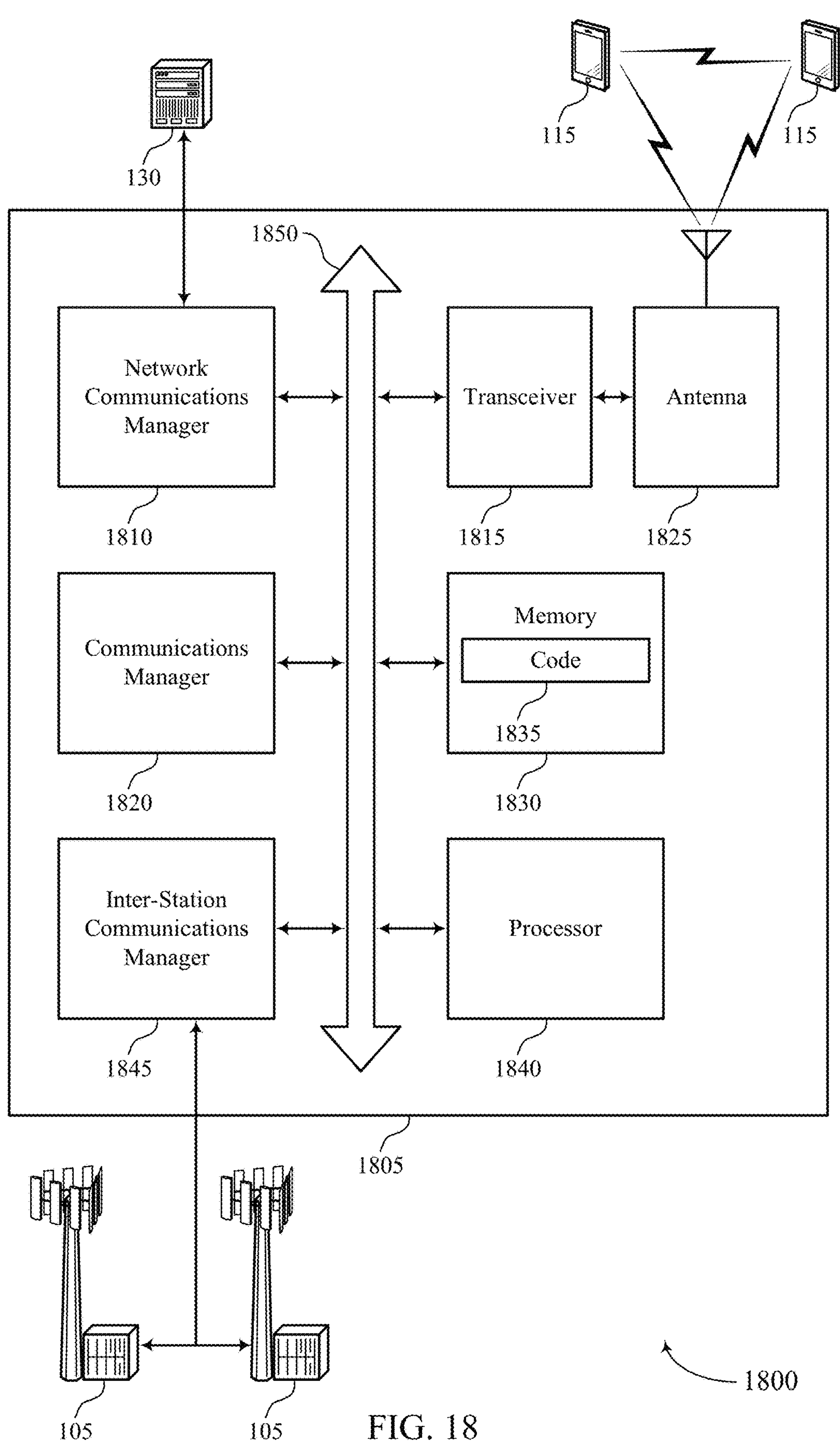
FIG. 18 shows a diagram of a system including a device that supports techniques for full-duplex LBT operations in an unlicensed radio frequency spectrum in accordance with aspects of the present disclosure.

FIG. 18 shows a diagram of a system 1800 including a device 1805 that supports techniques for full-duplex LBT operations in an unlicensed radio frequency spectrum in accordance with aspects of the present disclosure. The device 1805 may be an example of or include the components of a device 1505, a device 1605, or a base station 105 as described herein. The device 1805 may communicate wirelessly with one or more base stations 105, UEs 115, or any combination thereof. The device 1805 may include components for bi-directional voice and data communications including components for transmitting and receiving communications, such as a communications manager 1820, a network communications manager 1810, a transceiver 1815, an antenna 1825, a memory 1830, code 1835, a processor 1840, and an inter-station communications manager 1845. These components may be in electronic communication or otherwise coupled (e.g., operatively, communicatively, functionally, electronically, electrically) via one or more buses (e.g., a bus 1850).

The network communications manager 1810 may manage communications with a core network 130 (e.g., via one or more wired backhaul links). For example, the network communications manager 1810 may manage the transfer of data communications for client devices, such as one or more UEs 115.

In some cases, the device 1805 may include a single antenna 1825. However, in some other cases the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The memory 1830 may include RAM and ROM. The memory 1830 may store computer-readable, computer-executable code 1835 including instructions that, when executed by the processor 1840, cause the device 1805 to perform various functions described herein. The code 1835 may be stored in a non-transitory computer-readable medium such as system memory or another type of memory. In some cases, the code 1835 may not be directly executable by the processor 1840 but may cause a computer (e.g., when compiled and executed) to perform functions described herein. In some cases, the memory 1830 may contain, among other things, a BIOS which may control basic hardware or software operation such as the interaction with peripheral components or devices.

The processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting techniques for full-duplex LBT operations in an unlicensed radio frequency spectrum). For example, the device 1805 or a component of the device 1805 may include a processor 1840 and memory 1830 coupled to the processor 1840, the processor 1840 and memory 1830 configured to perform various functions described herein.

The inter-station communications manager 1845 may manage communications with other base stations 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communications network technology to provide communication between base stations 105.

The communications manager 1820 may support wireless communication at the device 1805 (e.g., a base station) in accordance with examples as disclosed herein. For example, the communications manager 1820 may be configured as or otherwise support a means for determining a set of resources for a channel access procedure in a shared radio frequency spectrum band, the set of resources including one or more ZP-RS resources, one or more reserved channel access resources, or both. The communications manager 1820 may be configured as or otherwise support a means for transmitting, to a UE, an RRC message including a configuration of the set of resources for the channel access procedure, where a period associated with the channel access procedure includes a duration in which the device 1805 (e.g., the base station) has not scheduled the UE to receive any downlink transmission. By including or configuring the communications manager 1820 in accordance with examples as described herein, the device 1805 may support techniques for more efficient utilization of communication resources and improved coordination between the device 1805 and other devices (e.g., UEs).

In some examples, the communications manager 1820 may be configured to perform various operations (e.g., receiving, monitoring, transmitting) using or otherwise in cooperation with the transceiver 1815, the one or more antennas 1825, or any combination thereof. Although the communications manager 1820 is illustrated as a separate component, in some examples, one or more functions described with reference to the communications manager 1820 may be supported by or performed by the processor 1840, the memory 1830, the code 1835, or any combination thereof. For example, the code 1835 may include instructions executable by the processor 1840 to cause the device 1805 to perform various aspects of techniques for full-duplex LBT operations in an unlicensed radio frequency spectrum as described herein, or the processor 1840 and the memory 1830 may be otherwise configured to perform or support such operations.

Figure 19:
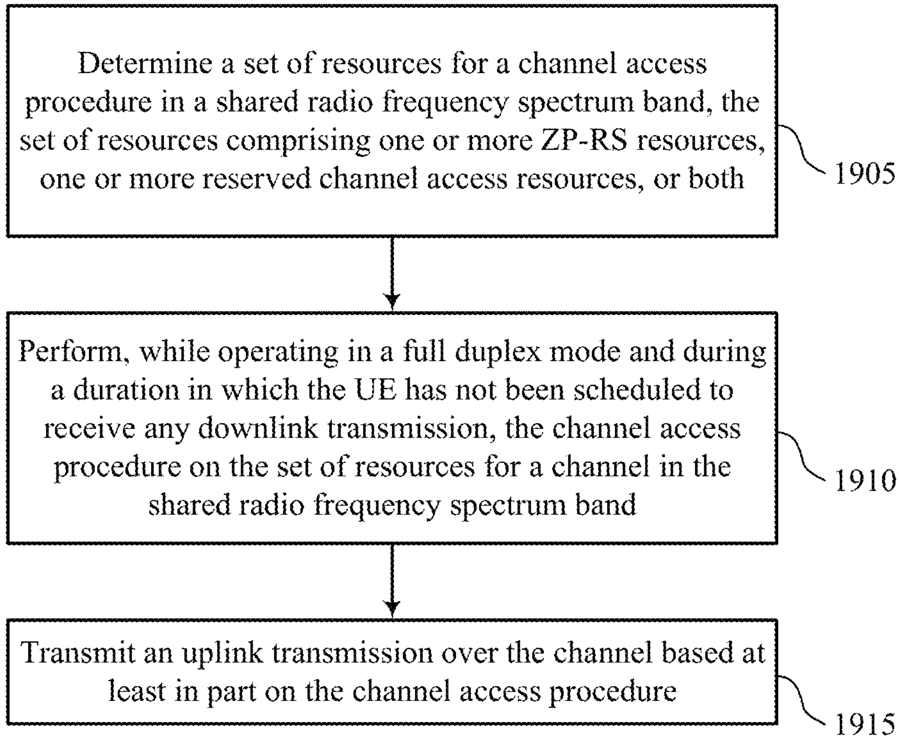

FIG. 19 shows a flowchart illustrating a method 1900 that supports techniques for full-duplex LBT operations in an unlicensed radio frequency spectrum in accordance with aspects of the present disclosure. The operations of the method 1900 may be implemented by a UE or its components as described herein. For example, the operations of the method 1900 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1905, the method may include determining a set of resources for a channel access procedure in a shared radio frequency spectrum band, the set of resources including one or more ZP-RS resources, one or more reserved channel access resources, or both. The operations of 1905 may be performed in accordance with examples as disclosed herein. In some examples, aspects of the operations of 1905 may be performed by a resource component 1325 as described with reference to FIG. 13.

At 1910, the method may include performing, while operating in a full duplex mode and during a duration in which the UE has not been scheduled to receive any downlink transmission, the channel access procedure on the set of resources for a channel in the shared radio frequency spectrum band. The operations of 1910 may be performed in accordance with examples as disclosed herein. In some examples, aspects of the operations of 1910 may be performed by a channel access component 1330 as described with reference to FIG. 13.

At 1915, the method may include transmitting an uplink transmission over the channel based on the channel access procedure. The operations of 1915 may be performed in accordance with examples as disclosed herein. In some examples, aspects of the operations of 1915 may be performed by an uplink component 1335 as described with reference to FIG. 13.

Figure 20:
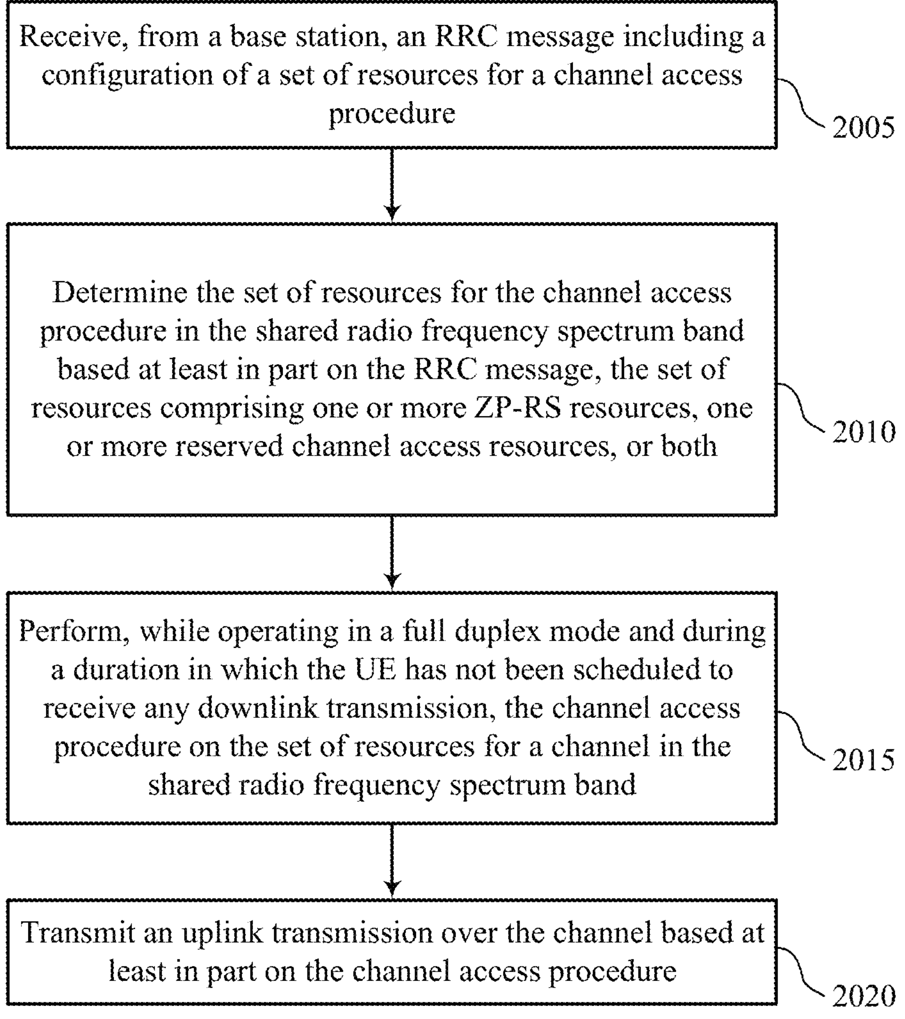

FIG. 20 shows a flowchart illustrating a method 2000 that supports techniques for full-duplex LBT operations in an unlicensed radio frequency spectrum in accordance with aspects of the present disclosure. The operations of the method 2000 may be implemented by a UE or its components as described herein. For example, the operations of the method 2000 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2005, the method may include receiving, from a base station, an RRC message including a configuration of a set of resources for a channel access procedure. The operations of 2005 may be performed in accordance with examples as disclosed herein. In some examples, aspects of the operations of 2005 may be performed by a configuration message 1340 as described with reference to FIG. 13.

At 2010, the method may include determining the set of resources for the channel access procedure in the shared radio frequency spectrum band based at least in part on the RRC message, the set of resources including one or more ZP-RS resources, one or more reserved channel access resources, or both. The operations of 2010 may be performed in accordance with examples as disclosed herein. In some examples, aspects of the operations of 2010 may be performed by a resource component 1325 as described with reference to FIG. 13.

At 2015, the method may include performing, while operating in a full duplex mode and during a duration in which the UE has not been scheduled to receive any downlink transmission, the channel access procedure on the set of resources for a channel in the shared radio frequency spectrum band. The operations of 2015 may be performed in accordance with examples as disclosed herein. In some examples, aspects of the operations of 2015 may be performed by a channel access component 1330 as described with reference to FIG. 13.

At 2020, the method may include transmitting an uplink transmission over the channel based on the channel access procedure. The operations of 2020 may be performed in accordance with examples as disclosed herein. In some examples, aspects of the operations of 2020 may be performed by an uplink component 1335 as described with reference to FIG. 13.

Figure 21:
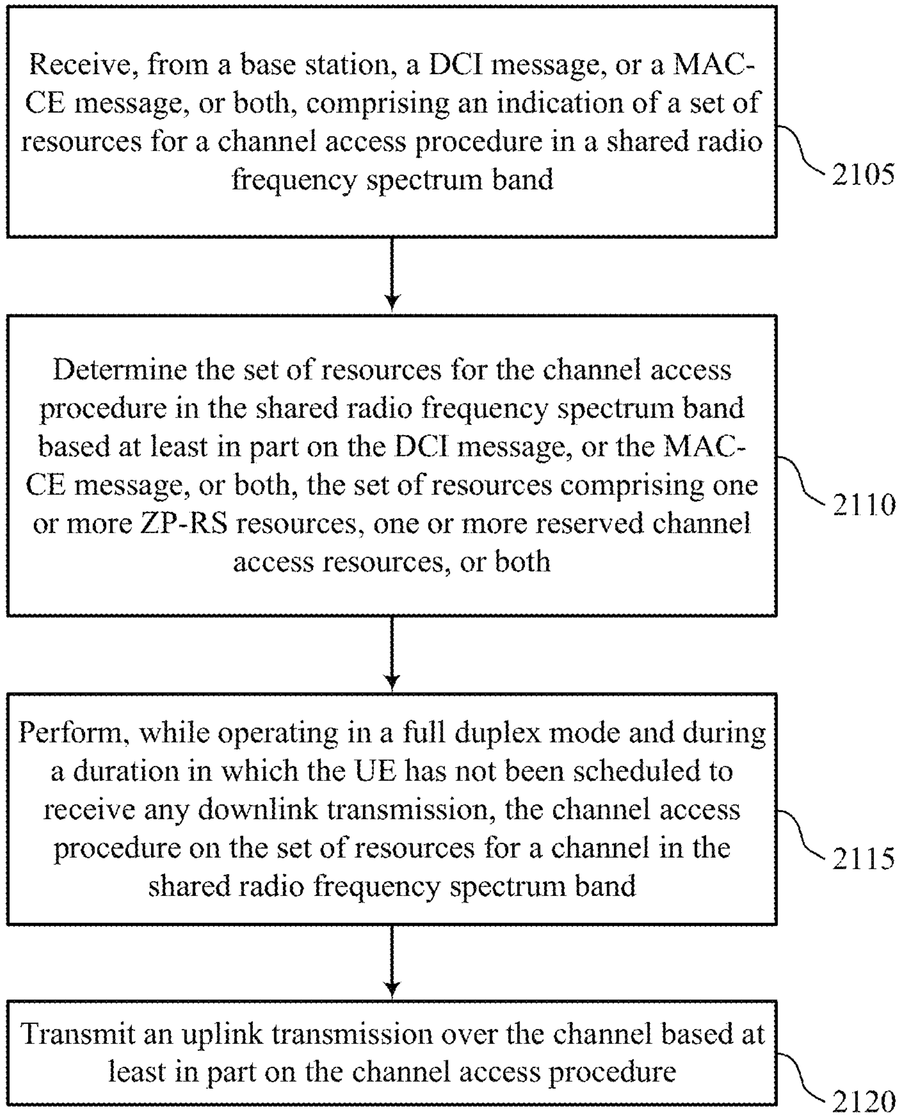

FIG. 21 shows a flowchart illustrating a method 2100 that supports techniques for full-duplex LBT operations in an unlicensed radio frequency spectrum in accordance with aspects of the present disclosure. The operations of the method 2100 may be implemented by a UE or its components as described herein. For example, the operations of the method 2100 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2105, the method may include receiving, from a base station, a DCI message, or a MAC-CE message, or both, including an indication of a set of resources for a channel access procedure in a shared radio frequency spectrum band. The operations of 2105 may be performed in accordance with examples as disclosed herein. In some examples, aspects of the operations of 2105 may be performed by a downlink component 1345 as described with reference to FIG. 13.

At 2110, the method may include determining the set of resources for the channel access procedure in the shared radio frequency spectrum band based at least in part on the DCI message, or the MAC-CE message, or both, the set of resources including one or more ZP-RS resources, one or more reserved channel access resources, or both. The operations of 2110 may be performed in accordance with examples as disclosed herein. In some examples, aspects of the operations of 2110 may be performed by a resource component 1325 as described with reference to FIG. 13.

At 2115, the method may include performing, while operating in a full duplex mode and during a duration in which the UE has not been scheduled to receive any downlink transmission, the channel access procedure on the set of resources for a channel in the shared radio frequency spectrum band. The operations of 2115 may be performed in accordance with examples as disclosed herein. In some examples, aspects of the operations of 2115 may be performed by a channel access component 1330 as described with reference to FIG. 13.

At 2120, the method may include transmitting an uplink transmission over the channel based on the channel access procedure. The operations of 2120 may be performed in accordance with examples as disclosed herein. In some examples, aspects of the operations of 2120 may be performed by an uplink component 1335 as described with reference to FIG. 13.

Figure 22:
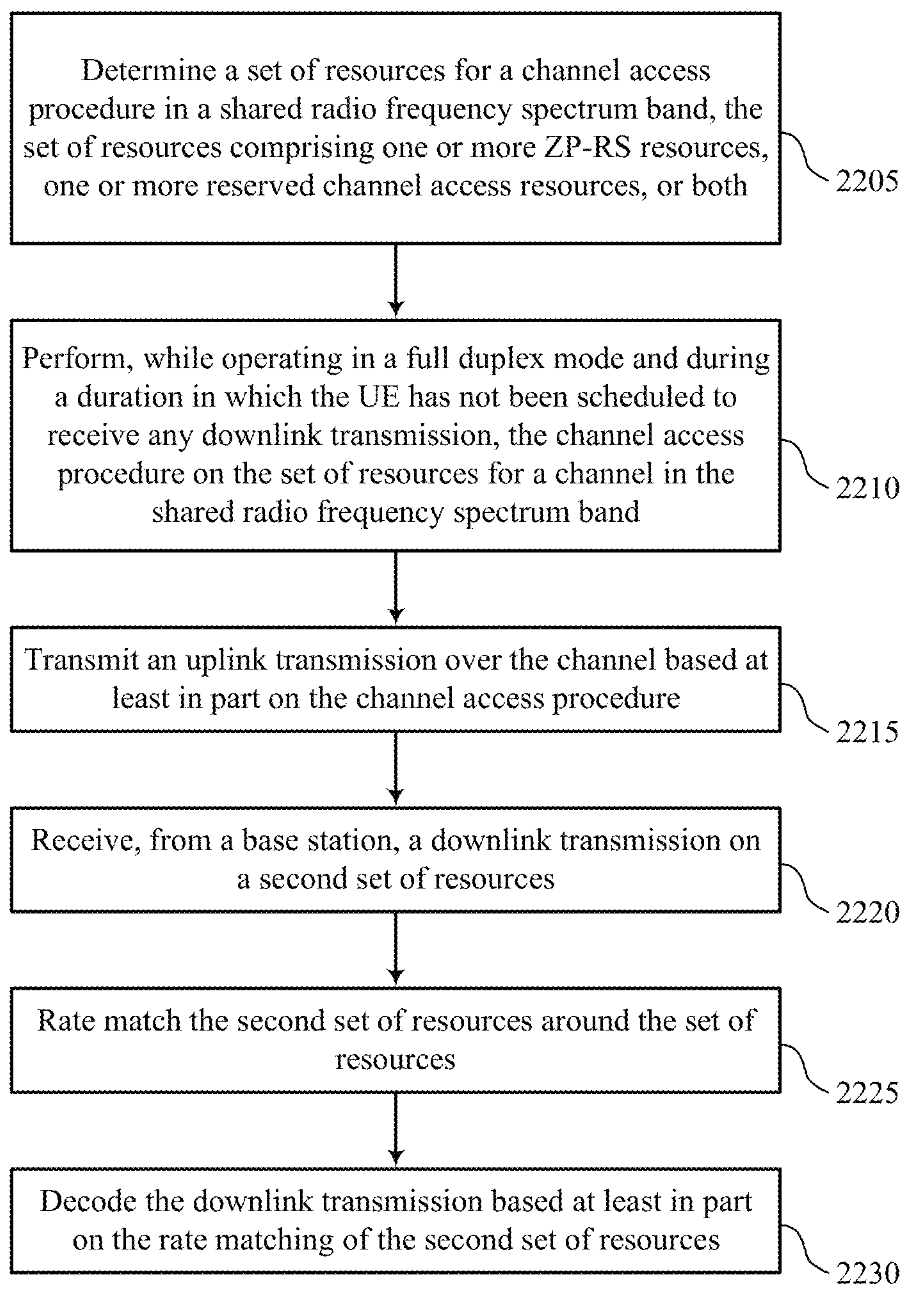

FIG. 22 shows a flowchart illustrating a method 2200 that supports techniques for full-duplex LBT operations in an unlicensed radio frequency spectrum in accordance with aspects of the present disclosure. The operations of the method 2200 may be implemented by a UE or its components as described herein. For example, the operations of the method 2200 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2205, the method may include determining a set of resources for a channel access procedure in a shared radio frequency spectrum band, the set of resources including one or more ZP-RS resources, one or more reserved channel access resources, or both. The operations of 2205 may be performed in accordance with examples as disclosed herein.

In some examples, aspects of the operations of 2205 may be performed by a resource component 1325 as described with reference to FIG. 13.

At 2210, the method may include performing, while operating in a full duplex mode and during a duration in which the UE has not been scheduled to receive any downlink transmission, the channel access procedure on the set of resources for a channel in the shared radio frequency spectrum band. The operations of 2210 may be performed in accordance with examples as disclosed herein. In some examples, aspects of the operations of 2210 may be performed by a channel access component 1330 as described with reference to FIG. 13.

At 2215, the method may include transmitting an uplink transmission over the channel based on the channel access procedure. The operations of 2215 may be performed in accordance with examples as disclosed herein. In some examples, aspects of the operations of 2215 may be performed by an uplink component 1335 as described with reference to FIG. 13.

At 2220, the method may include receiving, from a base station, a downlink transmission on a second set of resources. The operations of 2220 may be performed in accordance with examples as disclosed herein. In some examples, aspects of the operations of 2220 may be performed by a downlink component 1345 as described with reference to FIG. 13.

At 2225, the method may include rate matching the second set of resources around the set of resources. The operations of 2225 may be performed in accordance with examples as disclosed herein. In some examples, aspects of the operations of 2225 may be performed by a rate match component 1350 as described with reference to FIG. 13.

At 2230, the method may include decoding the downlink transmission based on the rate matching of the second set of resources. The operations of 2230 may be performed in accordance with examples as disclosed herein. In some examples, aspects of the operations of 2230 may be performed by a decoder component 1355 as described with reference to FIG. 13.

Figure 23:
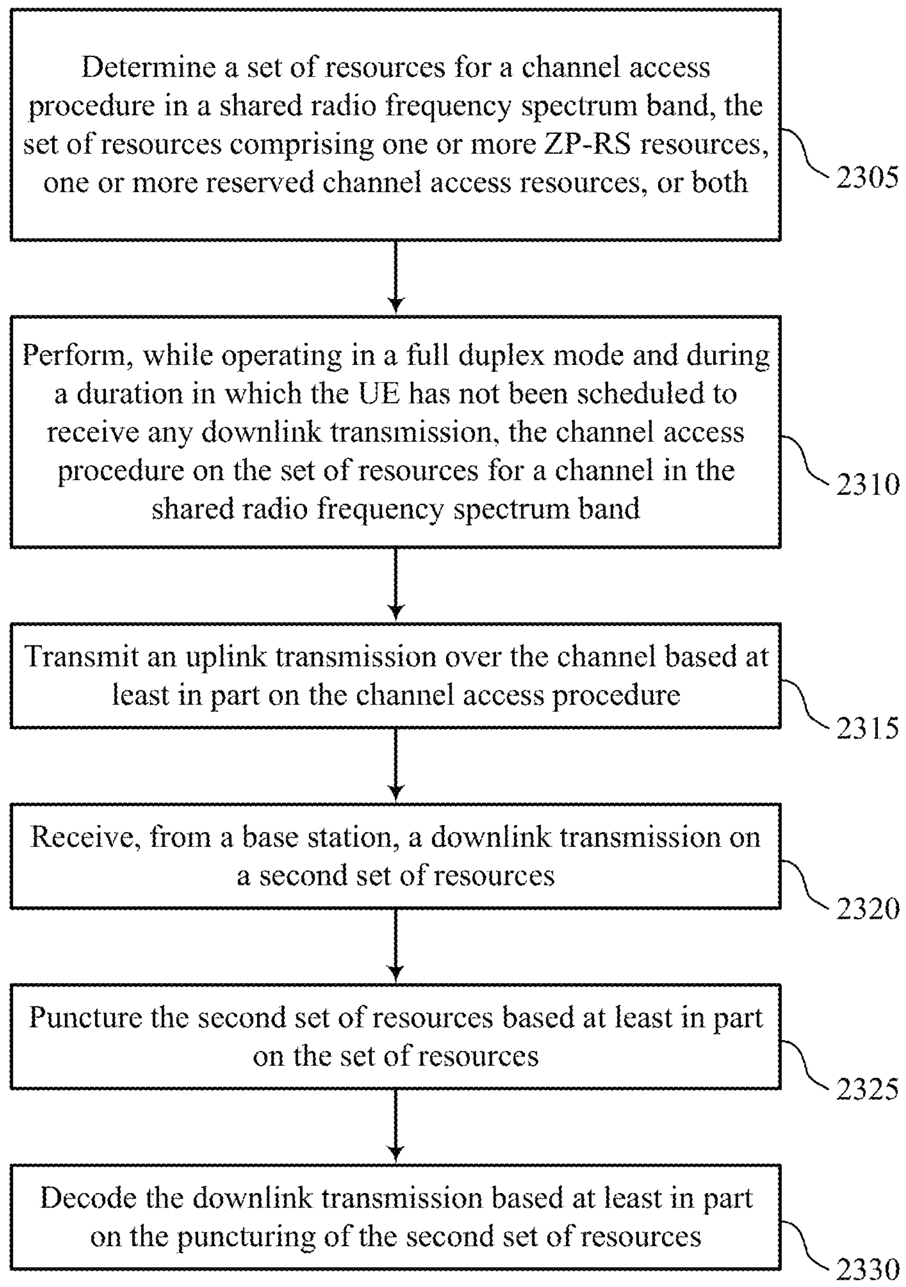

FIG. 23 shows a flowchart illustrating a method 2300 that supports techniques for full-duplex LBT operations in an unlicensed radio frequency spectrum in accordance with aspects of the present disclosure. The operations of the method 2300 may be implemented by a UE or its components as described herein. For example, the operations of the method 2300 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2305, the method may include determining a set of resources for a channel access procedure in a shared radio frequency spectrum band, the set of resources including one or more ZP-RS resources, one or more reserved channel access resources, or both. The operations of 2305 may be performed in accordance with examples as disclosed herein. In some examples, aspects of the operations of 2305 may be performed by a resource component 1325 as described with reference to FIG. 13.

At 2310, the method may include performing, while operating in a full duplex mode and during a duration in which the UE has not been scheduled to receive any downlink transmission, the channel access procedure on the set of resources for a channel in the shared radio frequency spectrum band. The operations of 2310 may be performed in accordance with examples as disclosed herein. In some examples, aspects of the operations of 2310 may be performed by a channel access component 1330 as described with reference to FIG. 13.

At 2315, the method may include transmitting an uplink transmission over the channel based on the channel access procedure. The operations of 2315 may be performed in accordance with examples as disclosed herein. In some examples, aspects of the operations of 2315 may be performed by an uplink component 1335 as described with reference to FIG. 13.

At 2320, the method may include receiving, from a base station, a downlink transmission on a second set of resources. The operations of 2320 may be performed in accordance with examples as disclosed herein. In some examples, aspects of the operations of 2320 may be performed by a downlink component 1345 as described with reference to FIG. 13.

At 2325, the method may include puncturing the second set of resources based on the set of resources. The operations of 2325 may be performed in accordance with examples as disclosed herein. In some examples, aspects of the operations of 2325 may be performed by a puncture component 1360 as described with reference to FIG. 13.

At 2330, the method may include decoding the downlink transmission based on the puncturing of the second set of resources. The operations of 2330 may be performed in accordance with examples as disclosed herein. In some examples, aspects of the operations of 2330 may be performed by a decoder component 1355 as described with reference to FIG. 13.

Figure 24:
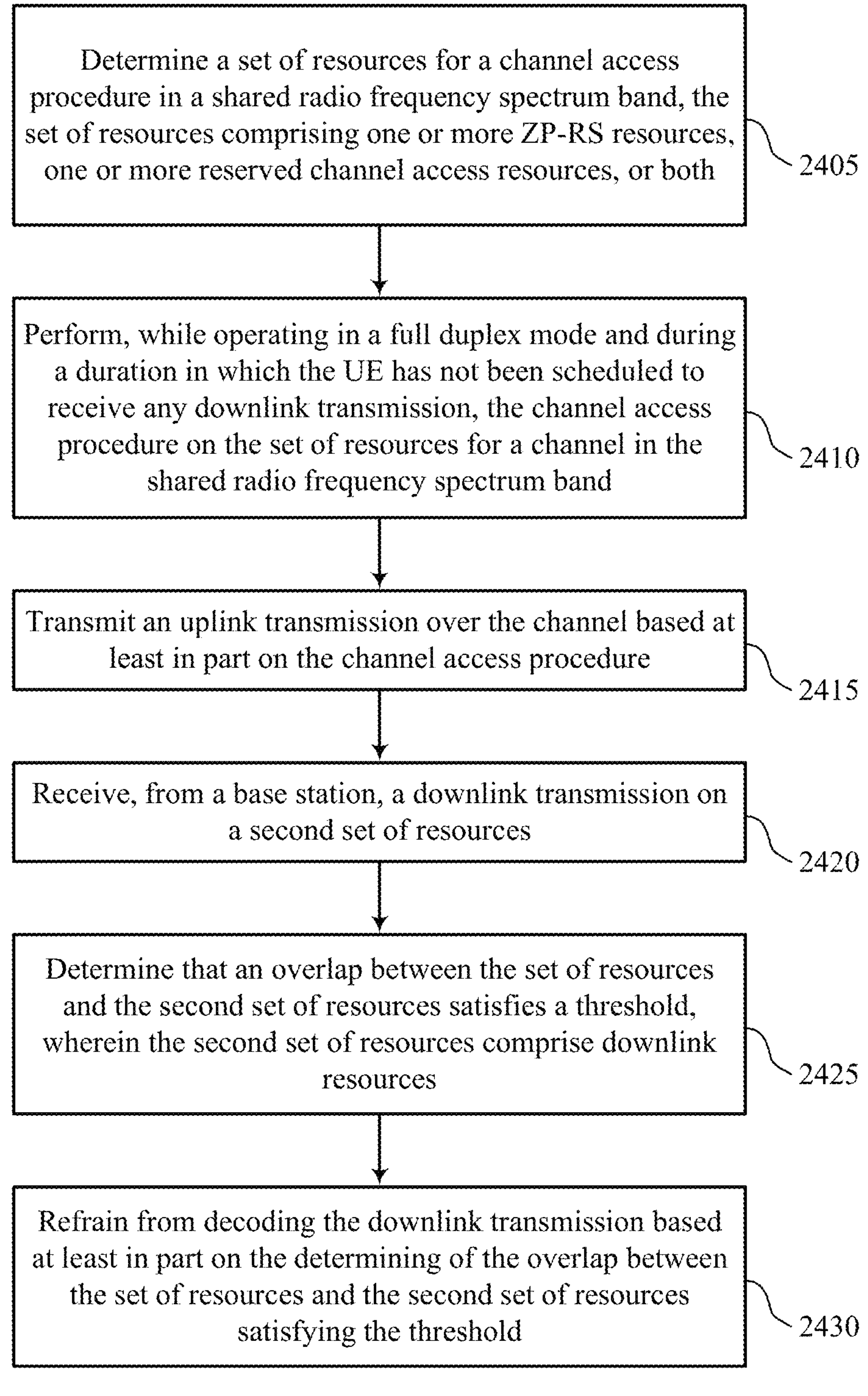

FIG. 24 shows a flowchart illustrating a method 2400 that supports techniques for full-duplex LBT operations in an unlicensed radio frequency spectrum in accordance with aspects of the present disclosure. The operations of the method 2400 may be implemented by a UE or its components as described herein. For example, the operations of the method 2400 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2405, the method may include determining a set of resources for a channel access procedure in a shared radio frequency spectrum band, the set of resources including one or more ZP-RS resources, one or more reserved channel access resources, or both. The operations of 2405 may be performed in accordance with examples as disclosed herein. In some examples, aspects of the operations of 2405 may be performed by a resource component 1325 as described with reference to FIG. 13.

At 2410, the method may include performing, while operating in a full duplex mode and during a duration in which the UE has not been scheduled to receive any downlink transmission, the channel access procedure on the set of resources for a channel in the shared radio frequency spectrum band. The operations of 2410 may be performed in accordance with examples as disclosed herein. In some examples, aspects of the operations of 2410 may be performed by a channel access component 1330 as described with reference to FIG. 13.

At 2415, the method may include transmitting an uplink transmission over the channel based on the channel access procedure. The operations of 2415 may be performed in accordance with examples as disclosed herein. In some examples, aspects of the operations of 2415 may be performed by an uplink component 1335 as described with reference to FIG. 13.

At 2420, the method may include receiving, from a base station, a downlink transmission on a second set of resources. The operations of 2420 may be performed in accordance with examples as disclosed herein. In some examples, aspects of the operations of 2420 may be performed by a downlink component 1345 as described with reference to FIG. 13.

At 2425, the method may include determining that an overlap between the set of resources and the second set of resources satisfies a threshold, where the second set of resources include downlink resources. The operations of 2425 may be performed in accordance with examples as disclosed herein. In some examples, aspects of the operations of 2425 may be performed by a resource component 1325 as described with reference to FIG. 13.

At 2430, the method may include refraining from decoding the downlink transmission based on the determining of the overlap between the set of resources and the second set of resources satisfying the threshold. The operations of 2430 may be performed in accordance with examples as disclosed herein. In some examples, aspects of the operations of 2430 may be performed by a decoder component 1355 as described with reference to FIG. 13.

FIG. 25 shows a flowchart illustrating a method 2500 that supports techniques for full-duplex LBT operations in an unlicensed radio frequency spectrum in accordance with aspects of the present disclosure. The operations of the method 2500 may be implemented by a base station or its components as described herein. For example, the operations of the method 2500 may be performed by a base station 105 as described with reference to FIGS. 1 through 10 and 15 through 18. In some examples, a base station may execute a set of instructions to control the functional elements of the base station to perform the described functions. Additionally or alternatively, the base station may perform aspects of the described functions using special-purpose hardware.

At 2505, the method may include determining a set of resources for a channel access procedure in a shared radio frequency spectrum band, the set of resources including one or more ZP-RS resources, one or more reserved channel access resources, or both. The operations of 2505 may be performed in accordance with examples as disclosed herein. In some examples, aspects of the operations of 2505 may be performed by a resource component 1725 as described with reference to FIG. 17.

At 2510, the method may include transmitting, to a UE, an RRC message including a configuration of the set of resources for the channel access procedure, where a period associated with the channel access procedure includes a duration in which the base station has not scheduled the UE to receive any downlink transmission. The operations of 2510 may be performed in accordance with examples as disclosed herein. In some examples, aspects of the operations of 2510 may be performed by a configuration component 1730 as described with reference to FIG. 17.

The following provides an overview of aspects of the present disclosure:

Aspect 1: A method for wireless communication at a UE, comprising: determining a set of resources for a channel access procedure in a shared radio frequency spectrum band, the set of resources comprising one or more ZP-RS resources, one or more reserved channel access resources, or both; performing, while operating in a full duplex mode and during a duration in which the UE has not been scheduled to receive any downlink transmission, the channel access procedure on the set of resources for a channel in the shared radio frequency spectrum band; and transmitting an uplink transmission over the channel based at least in part on the channel access procedure.

Aspect 2: The method of aspect 1, further comprising: receiving, from a base station, an RRC message comprising a configuration of the set of resources for the channel access procedure, wherein determining the set of resources for the channel access procedure is based at least in part on the RRC message.

Aspect 3: The method of aspect 2, further comprising: determining the set of resources for the channel access procedure in at least a time domain based at least in part on the configuration, wherein performing the channel access procedure is based at least in part on the set of resources in at least the time domain.

Aspect 4: The method of aspect 3, further comprising: identifying a bitmap indicating the set of resources in at least the time domain based at least in part on the configuration, the set of resources comprising one or more orthogonal frequency division multiplexing symbols in the time domain, wherein performing the channel access procedure is based at least in part on the bitmap indicating the set of resources in at least the time domain.

Aspect 5: The method of any of aspects 3 through 4, further comprising: identifying, based at least in part on the configuration, a beginning symbol of the set of resources in at least the time domain, an ending symbol of the set of resources in at least the time domain, or a length of the set of resources in at least the time domain, or any combination thereof, wherein performing the channel access procedure is based at least in part on the beginning symbol of the set of resources in at least the time domain, the ending symbol of the set of resources in at least the time domain, or the length of the set of resources in at least the time domain, or the combination thereof.

Aspect 6: The method of any of aspects 2 through 5, further comprising: determining a periodicity of the set of resources based at least in part on the configuration, wherein performing the channel access procedure is based at least in part on the periodicity of the set of resources.

Aspect 7: The method of any of aspects 2 through 6, further comprising: determining a symbol boundary or a slot boundary, or both, associated with the set of resources in at least a time domain based at least in part on the configuration, wherein performing the channel access procedure is based at least in part on the symbol boundary, or the slot boundary, or both, associated with the set of resources in at least the time domain.

Aspect 8: The method of any of aspects 2 through 7, further comprising: determining, based at least in part on the configuration, a resource pattern of the set of resources in at least a time domain, or at least a frequency domain, or both, wherein the set of resources are aperiodic based at least in part on the resource pattern, wherein performing the channel access procedure is based at least in part on the resource pattern of the set of resources in at least the time domain, or in at least the frequency domain, or both.

Aspect 9: The method of any of aspects 2 through 8, wherein the RRC message comprises an RRC IE indicating the set of resources for the channel access procedure in the shared radio frequency spectrum band.

Aspect 10: The method of any of aspects 1 through 9, further comprising: receiving, from a base station, a DCI message, or a MAC-CE message, or both, comprising an indication of the set of resources for the channel access procedure in the shared radio frequency spectrum band, wherein determining the set of resources for the channel access procedure is based at least in part on the DCI message, or the MAC-CE message, or both.

Aspect 11: The method of aspect 10, further comprising: determining timing information, or frequency information, both, associated with the set of resources based at least in part on the indication, wherein determining the set of resources for the channel access procedure is based at least in part on the timing information or frequency information, both, associated with the set of resources.

Aspect 12: The method of any of aspects 10 through 11, further comprising: activating one or more resources of the set of resources based at least in part on the indication, wherein performing the channel access procedure is based at least in part on the activating of the one or more resources of the set of resources.

Aspect 13: The method of any of aspects 10 through 12, further comprising: deactivating one or more resources of the set of resources based at least in part on the indication, wherein performing the channel access procedure is based at least in part on the deactivating of the one or more resources of the set of resources.

Aspect 14: The method of any of aspects 10 through 13, further comprising: selecting one or more resources of the set of resources based at least in part on the indication, wherein performing the channel access procedure is based at least in part on the selecting of the one or more resources of the set of resources.

Aspect 15: The method of any of aspects 1 through 14, further comprising: determining an overlap between the set of resources and a channel access occasion associated with the channel access procedure in a time domain, or a frequency domain, or both; and terminating the channel access procedure based at least in part on the overlap between the set of resources and the channel access occasion associated with the channel access procedure.

Aspect 16: The method of any of aspects 1 through 15, further comprising: determining an overlap between the set of resources and a channel access occasion associated with the channel access procedure in a time domain, or a frequency domain, or both; and adjusting a channel access parameter based at least in part on the overlap between the set of resources and the channel access occasion associated with the channel access procedure, wherein performing the channel access procedure is based at least in part on the adjusting of the channel access parameter.

Aspect 17: The method of any of aspects 1 through 16, further comprising: receiving, from a base station, a downlink transmission on a second set of resources; rate matching the second set of resources around the set of resources; and decoding the downlink transmission based at least in part on the rate matching of the second set of resources.

Aspect 18: The method of any of aspects 1 through 17, further comprising: receiving, from a base station, a downlink transmission on a second set of resources; puncturing the second set of resources based at least in part on the set of resources; and decoding the downlink transmission based at least in part on the puncturing of the second set of resources.

Aspect 19: The method of any of aspects 1 through 18, further comprising: receiving, from a base station, a downlink transmission on a second set of resources; determining that an overlap between the set of resources and the second set of resources satisfies a threshold, wherein the second set of resources comprise downlink resources; and refraining from decoding the downlink transmission based at least in part on the determining of the overlap between the set of resources and the second set of resources satisfying the threshold.

Aspect 20: The method of any of aspects 1 through 19, wherein the channel access procedure comprises an LBT procedure.

Aspect 21: A method for wireless communication at a base station, comprising: determining a set of resources for a channel access procedure in a shared radio frequency spectrum band, the set of resources comprising one or more ZP-RS resources, one or more reserved channel access resources, or both; transmitting, to a UE, an RRC message comprising a configuration of the set of resources for the channel access procedure, wherein a period associated with the channel access procedure comprises a duration in which the base station has not scheduled the UE to receive any downlink transmission.

Aspect 22: The method of aspect 21, further comprising: transmitting, to the UE, a DCI message, or a MAC-CE message, or both, comprising an indication of the set of resources for the channel access procedure in the shared radio frequency spectrum band.

Aspect 23: The method of any of aspects 21 through 22, wherein the configuration comprises a bitmap indicating the set of resources in at least a time domain based at least in part on the configuration, the set of resources comprising one or more orthogonal frequency division multiplexing symbols in the time domain.

Aspect 24: The method of any of aspects 21 through 23, wherein the configuration comprises a beginning symbol of the set of resources in at least a time domain, an ending symbol of the set of resources in at least the time domain, or a length of the set of resources in at least the time domain, or any combination thereof.

Aspect 25: The method of any of aspects 21 through 24, wherein the configuration comprises a periodicity of the set of resources.

Aspect 26: The method of any of aspects 21 through 25, wherein the configuration comprises a symbol boundary or a slot boundary associated with the set of resources in at least a time domain.

Aspect 27: The method of any of aspects 21 through 26, further comprising: transmitting, to the UE, an indication to activate or deactivate one or more resources of the set of resources for the channel access procedure.

Aspect 28: The method of any of aspects 21 through 27, further comprising: transmitting, to the UE, an indication to select one or more resources of the set of resources for the channel access procedure.

Aspect 29: An apparatus for wireless communication at a UE, comprising a processor; memory coupled with the processor; and instructions stored in the memory and executable by the processor to cause the apparatus to perform a method of any of aspects 1 through 20.

Aspect 30: An apparatus for wireless communication at a UE, comprising at least one means for performing a method of any of aspects 1 through 20.

Aspect 31: A non-transitory computer-readable medium storing code for wireless communication at a UE, the code comprising instructions executable by a processor to perform a method of any of aspects 1 through 20.

Aspect 32: An apparatus for wireless communication at a base station, comprising a processor; memory coupled with the processor; and instructions stored in the memory and executable by the processor to cause the apparatus to perform a method of any of aspects 21 through 28.

Aspect 33: An apparatus for wireless communication at a base station, comprising at least one means for performing a method of any of aspects 21 through 28.

PX0087 Aspect 34: A non-transitory computer-readable medium storing code for wireless communication at a base station, the code comprising instructions executable by a processor to perform a method of any of aspects 21 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

determining a set of zero-power reference signal resources for a listen-before-talk procedure performed by the UE in an unlicensed radio frequency spectrum band and when operating in a full-duplex mode, wherein the set of zero-power reference signal resources is determined based at least in part on a radio resource control information element configuring the set of zero-power reference signal resources on which the UE is to perform the listen-before-talk procedure in the unlicensed radio frequency spectrum band and an indication in a downlink control information message that activates one or more zero-power reference signal resources of the configured set of zero-power reference signal resources for the listen-before-talk procedure, the one or more activated zero-power reference signal resources comprising a portion of the configured set of zero-power reference signal resources;

determining a periodicity of the set of zero-power reference signal resources for the listen-before-talk procedure;

determining a quantity of overlapping resource blocks, a quantity of overlapping symbols, or both between the set of zero-power reference signal resources and a channel access occasion associated with the listen-before-talk procedure;

adjusting a threshold value for the listen-before-talk procedure based at least in part on the quantity of overlapping resource blocks, the quantity of overlapping symbols, or both between the set of zero-power reference signal resources and the channel access occasion associated with the listen-before-talk procedure;

performing, by sensing an energy of a channel relative to the adjusted threshold value during a duration in which the UE has not been scheduled to receive any downlink transmission and in accordance with the periodicity of the set of zero-power reference signal resources, the listen-before-talk procedure on the set of zero-power reference signal resources for the channel in the unlicensed radio frequency spectrum band, wherein performing the listen-before-talk procedure on the set of zero-power reference signal resources is based at least in part on the UE operating in the full-duplex mode; and transmitting, while operating in the full-duplex mode, an uplink transmission over the channel and on the set of zero-power reference signal resources based at least in part on the listen-before-talk procedure.

2. The method of claim 1, further comprising:

receiving, from a network device, a radio resource control message comprising a configuration of the set of zero-power reference signal resources for the listen-before-talk procedure, wherein determining the set of zero-power reference signal resources for the listen-before-talk procedure is based at least in part on the radio resource control message.

3. The method of claim 2, further comprising:

determining the set of zero-power reference signal resources for the listen-before-talk procedure in at least a time domain based at least in part on the configuration, wherein performing the listen-before-talk procedure is based at least in part on the set of zero-power reference signal resources in at least the time domain.

4. The method of claim 3, further comprising:

identifying a bitmap indicating the set of zero-power reference signal resources in at least the time domain based at least in part on the configuration, the set of zero-power reference signal resources comprising one or more orthogonal frequency division multiplexing symbols in the time domain, wherein performing the listen-before-talk procedure is based at least in part on the bitmap indicating the set of zero-power reference signal resources in at least the time domain.

5. The method of claim 3, further comprising:

identifying, based at least in part on the configuration, a beginning symbol of the set of zero-power reference signal resources in at least the time domain, an ending symbol of the set of zero-power reference signal resources in at least the time domain, or a length of the set of zero-power reference signal resources in at least the time domain, or any combination thereof, wherein performing the listen-before-talk procedure is based at least in part on the beginning symbol of the set of zero-power reference signal resources in at least the time domain, the ending symbol of the set of zero-power reference signal resources in at least the time domain, or the length of the set of zero-power reference signal resources in at least the time domain, or any combination thereof.

6. The method of claim 2, further comprising:

determining the periodicity of the set of zero-power reference signal resources based at least in part on the configuration.

7. The method of claim 2, further comprising:

determining a symbol boundary or a slot boundary, or both, associated with the set of zero-power reference signal resources in at least a time domain based at least in part on the configuration, wherein performing the listen-before-talk procedure is based at least in part on the symbol boundary, or the slot boundary, or both, associated with the set of zero-power reference signal resources in at least the time domain.

8. The method of claim 2, further comprising:

determining, based at least in part on the configuration, a resource pattern of the set of zero-power reference signal resources in at least a time domain, or at least a frequency domain, or both, wherein the set of zero-power reference signal resources are aperiodic based at least in part on the resource pattern, wherein performing the listen-before-talk procedure is based at least in part on the resource pattern of the set of zero-power reference signal resources in at least the time domain, or in at least the frequency domain, or both.

9. The method of claim 2, wherein the radio resource control message comprises the radio resource control information element indicating the set of zero-power reference signal resources for the listen-before-talk procedure in the unlicensed radio frequency spectrum band.

10. The method of claim 1, further comprising:

receiving, from a network device, the downlink control information message comprising the indication that activates the one or more zero-power reference signal resources of the configured set of zero-power reference signal resources for the listen-before-talk procedure in the unlicensed radio frequency spectrum band, wherein determining the set of zero-power reference signal resources for the listen-before-talk procedure is based at least in part on the downlink control information message.

11. The method of claim 10, further comprising:

determining timing information, or frequency information, or both, associated with the set of zero-power reference signal resources based at least in part on the indication, wherein determining the set of zero-power reference signal resources for the listen-before-talk procedure is based at least in part on the timing information, or the frequency information, or both, associated with the set of zero-power reference signal resources.

12. The method of claim 10, further comprising:

activating the one or more zero-power reference signal resources of the set of zero-power reference signal resources based at least in part on the indication, wherein performing the listen-before-talk procedure is based at least in part on the activating of the one or more zero-power reference signal resources of the set of zero-power reference signal resources.

13. The method of claim 10, further comprising:

deactivating one or more second zero-power reference signal resources of the configured set of zero-power reference signal resources based at least in part on the indication, wherein performing the listen-before-talk procedure is based at least in part on the deactivating of the one or more second zero-power reference signal resources of the configured set of zero-power reference signal resources.

14. The method of claim 10, further comprising:

selecting the one or more zero-power reference signal resources of the configured set of zero-power reference signal resources based at least in part on the indication, wherein performing the listen-before-talk procedure is based at least in part on the selecting of the one or more zero-power reference signal resources of the configured set of zero-power reference signal resources.

15. The method of claim 1, further comprising:

determining an overlap between the set of zero-power reference signal resources and the channel access occasion associated with the listen-before-talk procedure in a time domain, or a frequency domain, or both; and terminating the listen-before-talk procedure based at least in part on the overlap between the set of zero-power reference signal resources and the channel access occasion associated with the listen-before-talk procedure.

16. The method of claim 1, further comprising:

receiving, from a network device, a downlink transmission on a second set of resources;

rate matching the second set of resources around the set of zero-power reference signal resources; and decoding the downlink transmission based at least in part on the rate matching of the second set of resources.

17. The method of claim 1, further comprising:

receiving, from a network device, a downlink transmission on a second set of resources;

puncturing the second set of resources based at least in part on the set of zero-power reference signal resources; and decoding the downlink transmission based at least in part on the puncturing of the second set of resources.

18. The method of claim 1, further comprising:

receiving, from a network device, a downlink transmission on a second set of resources;

determining that an overlap between the set of zero-power reference signal resources and the second set of resources satisfies a threshold, wherein the second set of resources comprise downlink resources; and refraining from decoding the downlink transmission based at least in part on the determining of the overlap between the set of zero-power reference signal resources and the second set of resources satisfying the threshold.

19. A method for wireless communication at a network device, comprising:

determining a set of zero-power reference signal resources for a listen-before-talk procedure performed by a user equipment (UE) in an unlicensed radio frequency spectrum band and when operating in a full-duplex mode, the set of zero-power reference signal resources comprising at least one zero-power reference signal resource during which the UE is not scheduled to receive any downlink transmission;

transmitting, to the UE, a radio resource control message comprising a configuration of the set of zero-power reference signal resources for the listen-before-talk procedure, wherein a period associated with the set of zero-power reference signal resources comprises a duration in which the network device has not scheduled the UE to receive any downlink transmission, wherein the configuration comprises a radio resource control information element configuring the set of zero-power reference signal resources on which the UE is to perform the listen-before-talk procedure in the unlicensed radio frequency spectrum band and a periodicity of the set of zero-power reference signal resources;

transmitting, to the UE, a downlink control information message comprising an indication that activates one or more zero-power reference signal resources of the set of zero-power reference signal resources for the listen-before-talk procedure, the one or more activated zero-power reference signal resources comprising a portion of the configured set of zero-power reference signal resources;

transmitting signaling indicating that the UE is to adjust a threshold value for the listen-before-talk procedure based at least in part on a quantity of overlapping resource blocks, a quantity of overlapping symbols, or both between the set of zero-power reference signal resources and a channel access occasion associated with the listen-before-talk procedure; and receiving an uplink transmission on the set of zero-power reference signal resources based at least in part on transmitting the radio resource control message and the downlink control information message.

20. The method of claim 19, wherein the configuration comprises a bitmap indicating the set of zero-power reference signal resources in at least a time domain based at least in part on the configuration, the set of zero-power reference signal resources comprising one or more orthogonal frequency division multiplexing symbols in the time domain.

21. The method of claim 19, wherein the configuration comprises a beginning symbol of the set of zero-power reference signal resources in at least a time domain, an ending symbol of the set of zero-power reference signal resources in at least the time domain, or a length of the set of zero-power reference signal resources in at least the time domain, or any combination thereof.

22. The method of claim 19, wherein the configuration comprises a symbol boundary or a slot boundary associated with the set of zero-power reference signal resources in at least a time domain.

23. The method of claim 19, wherein transmitting the downlink control information message comprises:

transmitting, to the UE, a second indication to deactivate one or more second zero-power reference signal resources of the set of zero-power reference signal resources for the listen-before-talk procedure.

24. The method of claim 19, wherein the indication indicates for the UE to select the one or more zero-power reference signal resources of the set of zero-power reference signal resources for the listen-before-talk procedure.

25. An apparatus for wireless communication at a user equipment (UE), comprising:

one or more processors;

memory coupled with the one or more processors; and instructions stored in the memory and executable by the one or more processors to cause the apparatus to:

determine a set of zero-power reference signal resources for a listen-before-talk procedure performed by the UE in an unlicensed radio frequency spectrum band and when operating in a full-duplex mode, wherein the set of zero-power reference signal resources is determined based at least in part on a radio resource control information element configuring the set of zero-power reference signal resources on which the UE is to perform the listen-before-talk procedure in the unlicensed radio frequency spectrum band and an indication in a downlink control information message that activates one or more zero-power reference signal resources of the configured set of zero-power reference signal resources for the listen-before-talk procedure, the one or more activated zero-power reference signal resources comprising a portion of the configured set of zero-power reference signal resources;

determine a periodicity of the set of zero-power reference signal resources for the listen-before-talk procedure;

determine a quantity of overlapping resource blocks, a quantity of overlapping symbols, or both between the set of zero-power reference signal resources and a channel access occasion associated with the listen-before-talk procedure;

adjust a threshold value for the listen-before-talk procedure based at least in part on the quantity of overlapping resource blocks, the quantity of overlapping symbols, or both between the set of zero-power reference signal resources and the channel access occasion associated with the listen-before-talk procedure;

perform, by sensing an energy of a channel relative to the adjusted threshold value during a duration in which the UE has not been scheduled to receive any downlink transmission and in accordance with the periodicity of the set of zero-power reference signal resources, the listen-before-talk procedure on the set of zero-power reference signal resources for the channel in the unlicensed radio frequency spectrum band, wherein performing the listen-before-talk procedure on the set of zero-power reference signal resources is based at least in part on the UE operating in the full-duplex mode; and transmit, while operating in the full-duplex mode, an uplink transmission over the channel and on the set of zero-power reference signal resources based at least in part on the listen-before-talk procedure.

26. An apparatus for wireless communication at a network device, comprising:

one or more processors;

memory coupled with the one or more processors; and instructions stored in the memory and executable by the one or more processors to cause the apparatus to:

determine a set of zero-power reference signal resources for a listen-before-talk procedure performed by a user equipment (UE) in an unlicensed radio frequency spectrum band and when operating in a full-duplex mode, the set of zero-power reference signal resources comprising at least one zero-power reference signal resource during which the UE is not scheduled to receive any downlink transmission;

transmit, to the UE, a radio resource control message comprising a configuration of the set of zero-power reference signal resources for the listen-before-talk procedure, wherein a period associated with the set of zero-power reference signal resources comprises a duration in which the network device has not scheduled the UE to receive any downlink transmission, wherein the configuration comprises a radio resource control information element configuring the set of zero-power reference signal resources on which the UE is to perform the listen-before-talk procedure in the unlicensed radio frequency spectrum band a periodicity of the set of zero-power reference signal resources;

transmitting, to the UE, a downlink control information message comprising an indication that activates one or more zero-power reference signal resources of the set of zero-power reference signal resources for the listen-before-talk procedure, the one or more activated zero-power reference signal resources comprising a portion of the configured set of zero-power reference signal resources;

transmit signaling indicating that the UE is to adjust a threshold value for the listen-before-talk procedure based at least in part on a quantity of overlapping resource blocks, a quantity of overlapping symbols, or both between the set of zero-power reference signal resources and a channel access occasion associated with the listen-before-talk procedure; and receiving an uplink transmission on the set of zero-power reference signal resources based at least in part on transmitting the radio resource control message and the downlink control information message.

* * * * *